(12) United States Patent
Rancu et al.

(10) Patent No.: US 7,099,438 B2
(45) Date of Patent: Aug. 29, 2006

(54) MULTI-PROTOCOL, MULTI-INTERFACE COMMUNICATIONS DEVICE TESTING SYSTEM

(75) Inventors: Ovidiu Rancu, Anderson, SC (US); Mihai Moldovan, Westlake Village, CA (US)

(73) Assignee: IXIA, Calabasas, CA (US)

( * ) Notice: Subject to any disclaimer, the term of this patent is extended or adjusted under 35 U.S.C. 154(b) by 539 days.

(21) Appl. No.: 10/172,548

(22) Filed: Jun. 14, 2002

(65) Prior Publication Data

US 2003/0231741 A1 Dec. 18, 2003

(51) Int. Cl.
*H04M 1/24* (2006.01)
*H04M 3/08* (2006.01)
*H04M 3/22* (2006.01)

(52) U.S. Cl. ........................ 379/9; 379/9.02; 379/10.03; 370/241; 719/328

(58) Field of Classification Search ................ 379/1.01, 379/9, 9.01, 9.02, 9.03, 9.04, 14, 10.08, 26.01, 379/26.02, 29.01; 370/241, 244, 245, 247, 370/250, 251, 252; 719/328; 714/25, 26, 714/32, 39, 48, 57
See application file for complete search history.

(56) References Cited

U.S. PATENT DOCUMENTS

| | | | |
|---|---|---|---|
| 5,390,314 A | * | 2/1995 | Swanson .................... 717/138 |
| 5,546,453 A | | 8/1996 | Herbert |
| 5,555,285 A | | 9/1996 | Tapia et al. |
| 5,572,570 A | | 11/1996 | Kuenzig |
| 5,619,489 A | | 4/1997 | Chang et al. |
| 5,633,909 A | | 5/1997 | Fitch |
| 5,671,351 A | * | 9/1997 | Wild et al. .................... 714/38 |
| 5,761,272 A | | 6/1998 | Williams et al. |
| 5,787,147 A | * | 7/1998 | Gundersen ................ 379/10.03 |
| 5,835,565 A | | 11/1998 | Smith et al. |
| 5,835,566 A | * | 11/1998 | Cowgill .................... 379/15.01 |
| 5,854,889 A | | 12/1998 | Liese |
| 5,933,475 A | | 8/1999 | Coleman |
| 5,978,940 A | | 11/1999 | Newman et al. |
| 5,982,852 A | | 11/1999 | Schwartz |
| 5,987,633 A | | 11/1999 | Newman et al. |
| 6,058,181 A | | 5/2000 | Herbert |
| 6,148,277 A | | 11/2000 | Asava et al. |
| 6,189,031 B1 | | 2/2001 | Badger et al. |
| 6,201,853 B1 | | 3/2001 | Butler et al. |
| 6,279,124 B1 | * | 8/2001 | Brouwer et al. ............... 714/38 |
| 6,687,335 B1 | * | 2/2004 | Jones et al. ................. 379/1.01 |

* cited by examiner

*Primary Examiner*—Quoc Tran
(74) *Attorney, Agent, or Firm*—SoCal IP Law Group LLP; Mark Andrew Goldstein

(57) ABSTRACT

A multi-protocol, multi-interface communications device testing system is disclosed. The system simultaneously control communication channels of a communications platform though multiple Interface Protocols, such as TDM, IP and Telephony Application Program Interfaces. The system also allows the creation of multi Interface Protocol Test Scenarios, and displays the results of executing The test results from all Protocols Interfaces and records and displays results.

3 Claims, 37 Drawing Sheets

| Timing Benches | Statistic Counters | | |
|---|---|---|---|
| Parameters | | Channel Analysis | Global Analysis |
| ☑ Total Time(FlowFunctions) | | Value > 0.00 report as PASSED otherwise PASSED | Average() |
| ☑ Originated Call Duration(DialogicEngine) | | Value > 0.00 report as PASSED otherwise PASSED | Average() |
| ☑ Response Time(DialogicEngine) | | Value > 0.00 report as PASSED otherwise PASSED | Average() |
| ☑ Silence Time(DialogicEngine) | | Value > 0.00 report as PASSED otherwise PASSED | Average() |
| ☑ Originated Call Duration | | Value > 0.00 report as PASSED otherwise PASSED | Average() |
| ☑ Response Time | | Value > 0.00 report as PASSED otherwise PASSED | Average() |
| ☑ Silence Time | | Value > 0.00 report as PASSED otherwise PASSED | Average() |
| ☑ Timer 8 | | Value > 0.00 report as PASSED otherwise PASSED | Average() |
| ☑ Timer 9 | | Value > 0.00 report as PASSED otherwise PASSED | Average() |
| ☑ Timer 10 | | Value > 0.00 report as PASSED otherwise PASSED | Average() |
| ☑ Timer 11 | | Value > 0.00 report as PASSED otherwise PASSED | Average() |
| ☑ Timer 12 | | Value > 0.00 report as PASSED otherwise PASSED | Average() |
| ☑ Timer 6 | | Value > 0.00 report as PASSED otherwise PASSED | Average() |
| ☑ Time to Response | | Value < 2.00 report as PASSED otherwise FAILED | Average() |
| ☑ Callback Time | | | |
| ☑ Navigation Time | | Time to Response | ✕ |
| ☑ AA Transfer | | | |
| ☑ VMResponse | | Iteration/Channel Analysis \| Global Analysis Report | |
| ☑ FirstMenu | | Specify the Result Criteria for the selected item. | OK |
| ☑ VerifyMessage | | This Criteria will be applied for every Iteration/Channel. | |
| | | | Cancel |
| | | Criteria : [<  ▼] | |
| | | | Up |
| | | Value : [2] | |
| | | | Down |
| | | Report as : [PASSED ▼] Otherwise [FAILED ▼] | |

Fig. 24

| Parameters | Channel Analysis | Global Analysis |
|---|---|---|
| ☑ Messages Saved(FlowFunctions) | Value > 0.00 report as PASSED otherwise PASSED | Sum() |
| ☑ Messages Deleted(FlowFunctions) | Value > 0.00 report as PASSED otherwise PASSED | Sum() |
| ☑ Messages Listened(FlowFunctions) | Value > 0.00 report as PASSED otherwise PASSED | Sum() |
| ☑ Correct Greetings(FlowFunctions) | Value > 0.00 report as PASSED otherwise PASSED | Sum() |
| ☑ Incorrect Greetings(FlowFunctions) | Value < 56.00 report as FAILED otherwise PASSED | Sum() |
| ☑ Calls Originated | Value > 0.00 report as PASSED otherwise PASSED | Sum() |
| ☑ Calls Connected | Value > 0.00 report as PASSED otherwise PASSED | Sum() |
| ☑ Calls Disconnected by Network | Value > 0.00 report as PASSED otherwise PASSED | Sum() |
| ☑ Correct Geetings | Value > 0.00 report as PASSED otherwise PASSED | Sum() |
| ☑ Counter 20 | Value > 0.00 report as PASSED otherwise PASSED | Sum() |
| ☑ Counter 21 | Value > 0.00 report as PASSED otherwise PASSED | Sum() |
| ☑ Counter 22 | | Sum() |
| ☑ Counter 23 | | Sum() |
| ☑ Callback Requests | | Sum() |
| ☑ Callback Received | | Sum() |
| ☑ AA Transfers | | Sum() |
| ☑ MessageNo | | Sum() |

Iteration/Channel Analysis | Global Analysis Report

Specify the Operation to be performed for the selected Item. The selected Operation result will be listed in the Global Report.

Function: Sum()

OK | Cancel | Up | Down

MULTI-PROTOCOL, MULTI-INTERFACE COMMUNICATIONS DEVICE TESTING SYSTEM

REFERENCE TO CD

This application includes a computer program listing on one CD, which is incorporated herein by reference. The CD contains one file named sourcecode.txt.

FIELD OF THE INVENTION

The present invention relates to systems for testing telecommunications equipment, and in particular, to systems that automatically test the interoperability, features and load testing of complex, multi-interface, multi-protocol communications platforms, Next Generation Networks and Next Generation Networks Components.

BACKGROUND

Manufacturers of Communications devices (e.g., routers, PBX, communications servers, communications platforms) and application developers have adopted new open standards protocols such as TAPI, JTAPI, S.100 and CSTA, or developed their own proprietary protocols. As new products implementing these protocols are delivered to the marketplace, the need for device and software manufacturers to test for conformance to standards, performance and stability, as well as interoperability with applications, is increasingly critical. When testing complex communications and telephony systems, different types of tests must be performed to simulate all of the possible conditions and states the target system encounters during "live" operation. This variety of testing ensures that a telecommunications or computer telephony system is ready to provide a high-level of quality service. This testing also ensures that the target system continues to provide appropriate service during full operation. It is desirable for a testing system to be able to perform each of the following types of testing:

FUNCTIONALITY AND CONFORMANCE TESTING—The conformance testing refers to whether an application/system performs according to the related specifications. Manufacturers must ensure that their products are interoperable with applications that implement the same claimed standards. For example, a TAPI 3.X service provider should work with all the TAPI 3.X applications on the market and a TAPI 3.X application should work with all the TAPI 3.X service providers. In addition, interoperability between multiple applications sharing the same resources is critical. For example, with regard to application programming interfaces, it is important to ensure compatibility among applications from different vendors that perform distinct functions (e.g., call control, billing, etc) that share the same resources and which are integrated into a single solution. The service provider and the application need to be tested as mission critical software in order to offer the needed reliability and stability. To achieve this goal, testing must be done at both the service provider and application level.

LOAD AND STRESS TESTING—Telecommunications systems break down most frequently due to intensive usage or "load" situations. As a result, it is important to load the telecommunications system using real-world traffic, which simulates the actions, usage patterns, and media types (e.g. voice, fax, data, video) of real users during busy hours. Load tests should also analyze the responses that are returned from the target system to ensure that they are completely accurate. If system degradation or failure occurs, it must be determined why the problem occurred and it is necessary to pinpoint exactly what caused the problem in the target system.

ENDURANCE TESTING—Endurance testing measures the capability of the system under test to preserve its designed functionality when working in real world conditions over a long period of time.

REGRESSION TESTING—Hardware and software for telecommunications systems are upgraded periodically to add new system features or correct existing bugs. Whenever these types of changes are made to complex software systems, a tremendous risk exists because these changes or additions to the target system could corrupt its existing features. This problem requires the comprehensive testing of all the related features of the target system. Due to the amount of time required to manually perform these tests, it is critical to automate this regression testing process.

Various systems for performing communications testing are known in the art, such as the ChannelGauge system from G3 Nova Technologies, Inc. of West Lake Village, Calif., the "Hammer" line of testing systems from Emprix, Inc. of Waltham, Mass., and the Abacus and Abacus 2 testing systems from Zarak Systems of Sunnyvale, Calif. However, each of these systems has shortcomings that preclude the type of thorough and easy to use testing system of the present invention. For example, it is known to provide software to create Test Scenarios using a graphical user interface, in which different Test Functions are associated with different Communications Channels. However, this alone does not provide synchronization of Test Functions across multiple Communications Channels with different Interface Protocols, or the ability to incorporate new Interface Protocols, such as telephony applications programming Interface Protocols, into the scenario builder. Furthermore, it is known to scan a network to identify computers or agents that may be utilized in a testing scenario, but this does not provide an ability to itemize the Interface Protocols that may be used on each computer. Moreover prior systems do not provide for analysis profiles, cross analysis or layered result analysis of test results. It is also known to provide a communications system tester that uses telephony API function calls to control a communications platform via the communications server software that directly controls the communications hardware of the communications platform. Such functionality is present in the TAPI Capacity Tester from Genoa Technology, of Moorpark, Calif. 93021. However, many of the foregoing systems suffer from the deficiency of not being able to provide a testing system that can simultaneously test all of the Interface Protocols utilized by today's complex communications platforms. This, in part, is due to multitude of ways that Communications Channel endpoints are identified and controlled in a complex communications platform. For example, the information needed to control a Voice over IP (VoIP) Communications Channel endpoint might be a H323 endpoint, an IP address, and a unique phone number identifier. However, the information needed to control a T1 Communications Channel that terminates in a Dialogic board, for example, might be the Dialogic board name, the span, timeslot, and a unique phone number identifier. The information needed to control a CDR Communications Channel might be a CTM Server name and a computer name. Likewise, for the TAPI 2.x Interface Protocol, the information needed to identify and control a specific Communications Channel endpoint could include a Line ID, and address, and line information.

Accordingly, as the number of Interface Protocols for a communications platform increase, the difficulty of providing a system that can simultaneously control and test different Communications Channels that use different Interface Protocols of the communication platform increases exponentially.

Many other problems relating to testing are caused by the increased complexity of communications platforms. For example, because newer communications platforms have greater capacity, it is necessary to utilize more test equipment (such an automated bulk call generators) to interface with a communications platform to test it. However, it is still important to have a central console from which the Test Scenario is controlled. Because the central console must be networked to the test equipment during the test, this means that there will be significant network traffic between the testing console and the test equipment. This network traffic devoted to executing the Test Scenario, and collecting the resulting data, can itself become a bottleneck, which prevents the test equipment from being utilized to its capacity for testing the communications platform. Accordingly, there is a need for a system that reduces network traffic associated with the testing console and test equipment.

This problem has been partially addressed by systems such as ChannelGauge of G3 Nova Technologies, Inc. of Westlake Village, Calif. This product uses Agents, or software, usually on remote computers, connected to test equipment, that can receive all or a portion of a Test Scenario and independently execute it and without the necessity of significant overhead network traffic from the testing console. In addition, Agents record command responses and status information from communications devices regarding a Communications Channel. However, the use of Agents creates additional problems. It is more difficult to define a Test Scenario on the testing console when there a multiple Agent computers. It is difficult to keep track of which computers are connected to which test equipment, and the communications resources of each test piece of test equipment connected to each Agent computer. In addition, as communications platforms increase in complexity by implementing more Interface Protocols, it will become even more difficult to keep track of which Agents are interfaced with test equipment that implements the various Interface Protocols. While all of this information can be "hard coded" into a Test Scenario, it makes the Test Scenarios more difficult to write and modify. Moreover, the use of Agents does not necessarily diminish the network traffic associated with transmitting test results to the testing console (or a separate database server).

Another problem resulting from the increased capacity of communications platforms having many Communications Channels is the difficulty of writing Test Scenarios to test all of the Communications Channels. Writing Test Scenarios is a tedious process, and it is made worse by communications platforms having hundreds or even thousands of Communications Channels. Accordingly, it is desirable to provide a system and method to increase the efficiency with which Test Scenarios can be written for platforms having large numbers of Communications Channels.

Another significant problem with newer communications platforms is that many are designed to interface with other pieces of expensive network equipment. Sometimes, the other expensive network equipment can cost over a million dollars or more. As a practical matter, many testing facilities do not have the resources to purchase all of the network equipment designed to interact with a communications platform. This can lead to instances where a new communications platform can not be adequately tested before being released to the public, which decreases the reliability of the communications platform. Accordingly, it is desirable to provide a method for emulating communications equipment that a communications platform is intended to interact with so that the platform can be tested without having to purchase expensive equipment.

Another problem with testing communications platforms is that they are increasingly provided by their manufacturers with communications services provider software having a telephony API that is not generally accepted in the marketplace, or even worse, proprietary. This makes it difficult to thoroughly test the communications services provider software, or other devices intended to connect to interact with it.

Another problem with communications platform test systems is the ability to test platforms that implement multiple Interface Protocols. Generally, some systems exist that allow, for example, testing of multiple telephony applications program interfaces, or which allow the testing of internet protocol communications or TDM Interface Protocol communications, but not in a simultaneous Test Scenario. These limits the "real world" testing that can be done, as it is desirable for a platform to be testing all Interface Protocols simultaneously. Moreover, to conduct Test Scenarios, it is often desirable to synchronize the Test Functions that take place across different Communications Channels. For example, it is often necessary to place a call on a first Communications Channel to a second Communications Channel, and the have the call answered on the second Communications Channel. While synchronization has been implemented in test systems in which both Communications Channels use the same Interface Protocol, synchronization has not been effectively implemented across different Interface Protocols, such as when a call is placed via a TDM Communications Channel to a voice of Internet Protocol (VoIP) phone.

A more fundamental problem with communications testing systems relates to their flexibility to keep up with the pace of new Interface Protocols for new communications platforms. It is very difficult and time-consuming to write a testing system for a specific Interface Protocol, yet new Interface Protocols are introduced on the market with increasing frequency. This has required significant rewriting of communications testing software systems, which is slow and expensive. Accordingly it is desirable to provide a communications testing system that allows new Interface Protocols to be "plugged in" so they can be used without significant rewriting of the core testing software.

Another problem with communications testing systems is the ability to provide meaningful results. It is possible to capture a great deal of information about each Test Function in a Test Scenario, such as the exact time the function began, the command used to implement the function, the result code, the Communications Channel status, etc. However, this can result in information overload when many iterations of tests comprised of numerous Test Functions are run across thousands of Communications Channels. At times, highly detailed information is necessary to pinpoint equipment design flaws and bottlenecks, but when testing only for capacity specifications, collecting too much information is undesirable, and as noted above, the excessive collection of information can actually impede the ability to perform the tests. Accordingly, it is desirable to provide a communications testing system with flexible information collection and analysis capabilities. In particular, it is desirable to generate information that provides various levels of detail, and allows visual display so that it may be easily understood. In addition, it is desirable to provide a system that allows pass/warning/fail criteria to be specified after a test is complete and the data has been gathered, so that the performance of a communications platform may be more completely assessed.

Another problem with communications test systems relates to the ability to obtain information regarding the status of a Communications Channel. For example, different telephony APIs (such as TAPI, JTAPI, S.100, S.410, CDR and WMI) provide different levels of information regarding the status of a Communications Channel. For example, a communications service provider for a communications platform can support multiple both S.100 and TAPI telephony API. The S.100 telephony API provides detailed information about a streaming media communication, such as a playing wave files or tone files, or bridging conversations. However, the TAPI telephony API provides more powerful call control processing. Accordingly, it would be desirable to have a communications test system that can use multiple protocols to obtain the maximum information about the Communications Channel of a communications platform.

SUMMARY OF THE INVENTION

Accordingly, it is desirable to provide a Communications Platform Testing System having some or all of the following features:

Ability to work with multiple Communications Channels

Ability to simultaneously communicate with a Communications via multiple interfaces, such as PSTN, IP, Telephony APIs, and cable.

Ability to simultaneously communicate with a Communications Platform via multiple protocols, such as S.100, S.410, CDR, M.100, TAPI (all versions) WMI API, CSTA, JTAPI and other user-defined protocols and APIs or protocols that may be defined in the future.

Ability to execute Test Scenarios based each interface and each protocol.

Ability to Start and stop Test Scenario execution on a local host and on remote Agents a finite or an infinite number of iterations.

Ability to manage execution results and log information.

Ability to collect detailed information during test execution.

Ability to provide execution results (e.g., PASSED, FAILED or SKIPPED) for every execution step and analysis of the results based on user defined criteria.

Ability, if a FAILED result is encountered, to stop execution on the specified Logical Channel, report the failure cause or description and gracefully recover the resources used on that Logical Channel.

Announce the presence of each remote Agent on the network.

BRIEF DESCRIPTION OF THE DRAWINGS

FIG. 3 is a view of a graphical user interface for a communications testing system showing a Unified execution profile for two Agents.

FIG. 11 is a view of a graphical user interface for a communications testing system showing a window for the status of Communications Channels during execution of a Test Scenario.

FIG. 21 is a view of a graphical user interface for a communications testing system showing a window for displaying, form a reports manager module, the execution profile for a particular test scenario.

FIG. 23 is a view of a graphical user interface for a communications testing system showing a window for specifying pass/warning/fail criteria for an analysis profile.

FIG. 24 is a view of a graphical user interface for a communications testing system showing a window for specifying whether collected numerical information should be reported as a total or an average.

FIG. 28 is a view of a graphical user interface for a communications testing system showing an execution profile pane, before associating Test Sequences with Logical Channels.

FIG. 31 is a view of a graphical user interface for a communications testing system showing an execution profile pane, after associating Test Sequences with Logical Channels.

FIG. 34 is a view of a graphical user interface for a communications testing system showing a method of specifying a Time Profile for a Logical Channel.

DETAILED DESCRIPTION

Figure 1A:
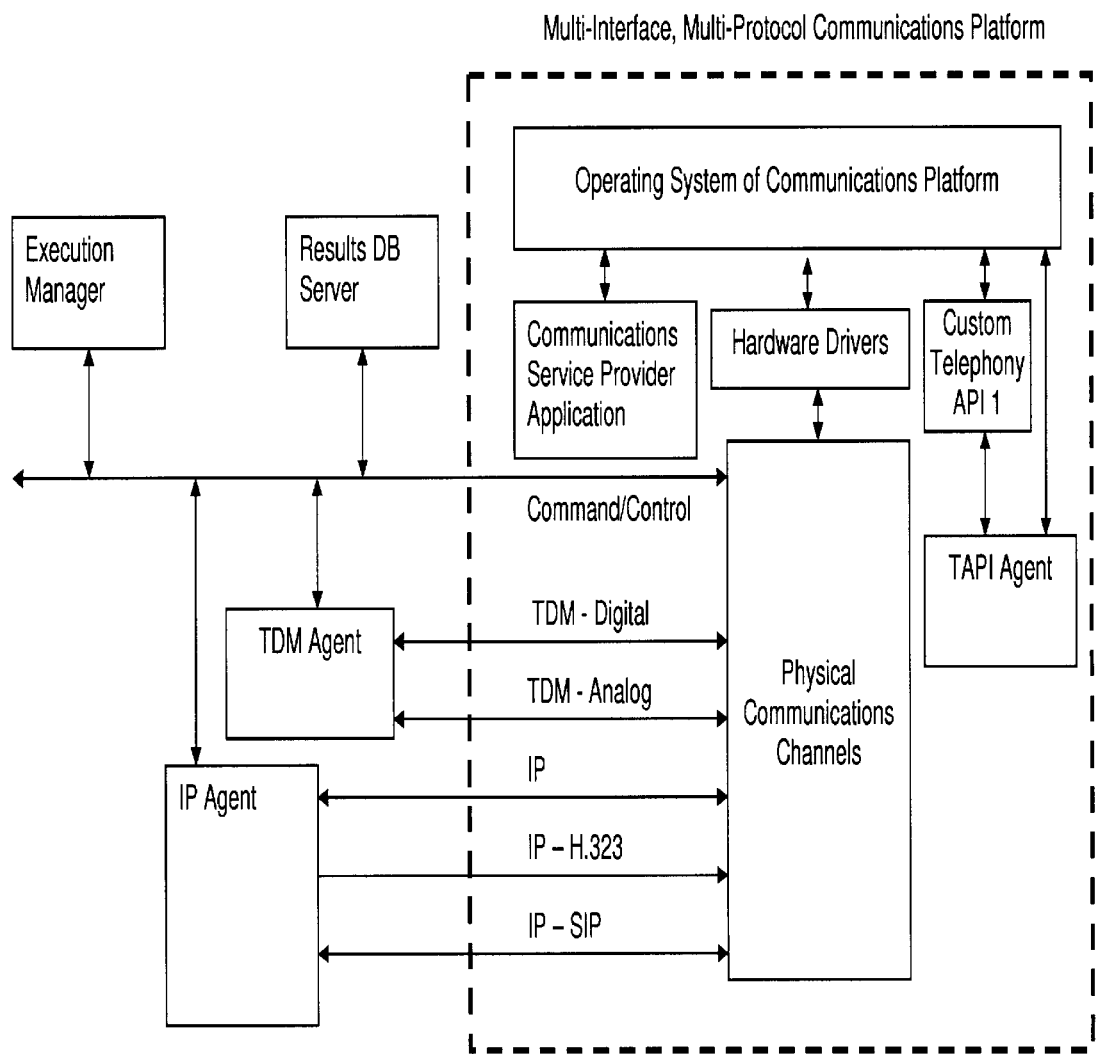
FIG. 1a is a diagrammatic view of the elements of a communications platform and an embodiment of a communications platform testing system.

Definitions used herein are as follows.

An "Agent" means a software program (either stand-alone or a subroutine/function) that exchanges command and status information between a Test Scenario execution portion of a communications testing system and an endpoint of a Communications Channel of a Communications Platform. There may be a device between an Agent and an endpoint of a Communications Channel, such as when an Agent is installed on a computer that is controlling a bulk call generator connected to the Communications Channels of a Communications Platform. An Agent causes Test Function commands to be executed upon a Communications Channel, either by controlling either equipment such as a bulk call generator, or by passing telephony API commands to the Communications Platform. An Agent also monitors the status of a Communications Channel, either via intermediate equipment or a telephony API, and reports or records status information. An Agent may be installed on the Communications Platform being tested, or it may be installed on a separate computer that directly or indirectly connects to a Communications Channel, or both. When an Agent communicates with a Communications Platform via a telephony Application Program Interface, it will be installed directly on the Communications Platform (it being understood that the Communications Platform may include a computer separately connected to the device providing the Communications Channel endpoints.

An "Application Program Interface" (or "API") is a predefined set of software calls and data formats by which a first application software program running under an operating system sends or receives, through the operating system under which it is running, a command or information to or from a second application software program running under the operating system.

A "Driver" is a software module that exchanges commands and data exclusively between a hardware device and an operating system under which the driver is installed.

A "Communications Channel" is a communications path between two computers or communication devices. It can refer to the physical medium (e.g., wires, cable or optical fiber) or to a set of properties that distinguishes one channel from another. For example, TV channels refer to particular frequencies at which radio waves are transmitted. In some instances, multiple Communications Channels are carried over a single physical medium, such as communications on different frequencies on the same cable, or where multiple voice communications are carried on a single wire via time division multiplexing (TDM).

A "Communications Platform" is a physical device having multiple endpoints for Communications Channels though which communications take place, and which is capable of controlling the communications on the Communications Channels. A Communications Platform can consist of separate, but connected, pieces of equipment, such as a unit containing the physical plugs for the Communications Channels, which receives control command through a connected computer. Examples of Communications Platforms include PBXs and telephony switches. Traditionally, Communications Platforms were limited to handling communications only through PSTN protocols, but it is increasingly common for them to handle communications using many different protocols, such as IP, JTAPI, CSTA, S.100, S.410, CDR, M.100, TAPI (all versions) or WMI.

An "Interface Protocol Library" is a software module that defines and implements Test Functions for an interface library, and which is capable of being identified by Test Scenario builder software. Specifically, an Interface Protocol Library implements at least a subset of the functions of the protocol.

"Log Data" for a Test Function is information pertaining to the execution of a Test Function of a Test Function Sequence. Examples of Log Data include: a unique identifier for the Communications Channel (i.e., IP and port numbers, or alphanumeric host identifier and physical channel number), time the Test Function began, duration of execution of the Test Function, the command issued to the device controlling the Communications Channel, the result code(s) received from the device controlling the Communications Channel, and status information from the device controlling the Communications Channel.

"Log Detail Level" means and indicator of the amount of information to collect regarding execution of a Test Function.

"Logical Channel" is an identifier (or reference) for a Communications Channel. The term is used to prevent ambiguity, because, for example, multiple pieces of communications equipment or software can serve as endpoints for a subset of the Communications Channels of a Communications Platform. (For example, two 128 channel bulk call generators can be connected to a 256 channel Communications Platform.)

A "Multi-interface, Multi-Protocol Communications Platform" is a Communications Platform having endpoints for at least two Communications Channels, and which can use at least two different Interface Protocols to control communications on the Communications Channels.

A "Interface Protocol" is a predefined methodology or protocol and one or more data formats by which a communication takes place or is controlled on a Communications Channel. Examples of Interface Protocols include TDM (T1/E1), Fax, Voice over IP, and telephony APIs.

A "Relative Channel" refers to a channel designator in a Test Scenario file. For example, a Test Scenario that includes for functions for five Communications Channels will have five Relative Channels. The Relative Channels can later be associated with one or more actual Communications Channels that will be the subject of the Test Scenario when it is executed.

A "Telephony Application Program Interface" is an Application Program Interface in which the commands received by the first application software program can control a Communications Channel or provide information about a Communications Channel. Control of a Communications Channel can include, for example, placing a call, answering a call, switching or holding a call, or providing information regarding a call, on a Communications Channel. Examples of Telephony Application Program Interfaces include TAPI, JTAPI, CSTA, M.100, S.410, CDR and WMI.

A "Test Function" is a discrete function that may be applied to a Communications Channel, such as stop, start, make call, answer call, conference call, transfer call, switch call, play recording, etc. The Test Functions which may be used for a particular Interface Protocol will depend on specification for the Interface Protocol.

A "Test Function Sequence" is a collection of all the Test Functions associated with a specific logical or Communications Channel, including the logic defining how the Test Functions should be executed depending on the results of other functions in the Test Function Sequence.

A "Test Scenario" is a combination of one or more Test Function Sequences that make up a test. A Test Scenario may include other Test Scenarios.

A "Time Profile" is a representation of one more delays (random or fixed) specified for execution of a Test Sequence for a Channel. A Time Profile consists of either a delay before the execution of the Test Sequence, and/or, if a Test Sequence is specified to repeat, a delay between the iterations of the Test Sequence. A delay is a time which may be either a fixed time (e.g., 500 milliseconds), a random amount of time, or a linear time with a specified step (the step may be positive or negative). Time profiles are usually included in a Test Function to simulate real life scenarios, such as the duration of a phone call.

"User Specified Statistical Data" means data that: (a) by default, is not collected and stored by any default system of a communications testing system; and (b) constitutes either: (i) information based on counts; or (ii) timing information. Examples of User Specified Statistical Data include counts for line open failed, generate digits error, calls initiated, calls completed; and averages for items such as response time, time to connect, or silence time.

Overview of Testing Environment

Physical Infrastructure The present invention may be used to test a Multi-interface, Multi-protocol communications platform, (a "Platform"). As shown in FIG. 1a, such a Platform typically has a number of subcomponents, including a computer that includes an operating system and a communications services application. The communications services application is typically written by the manufacturer of the communications platform, and comprises software used to control the communication channel endpoints, which are also components of the Platform. In one embodiment, the Communications Service Provider Application conforms to one or more API protocols through which the telephony components of the Platform may be controlled. For example the Communications Service Provider Application may conform to Microsoft's TAPI protocol, which is a Telephony API or (TAPI). (It should be noted that "TAPI" has two meanings in the industry, it is a generic acronym for Telephony Application Program Interface, but Microsoft Corp. has also published a specific Telephony Application Program Interface, which it named TAPI.)

The Platform includes a number of means of communications. Typically, it will include an Ethernet port for connection to a network, which in FIG. 1a is labeled "command/control." Command and information can be exchanged though this port, and the Communications Service Provider Application may receive commands from external software applications that it uses to control the Communications Channels. There are usually multiple Communications Channels, and increasingly, these channels implement more than one Interface Protocol. For example, as shown in FIG. 1a, the Communications Platform implements five Interface Protocols: TDM Analog, TDM Digital, IP, IP H.323 and IP SIP. As shown, these represent a plurality of Communications Channels through which telephony communications pass via multiple Interface Protocols. It is also possible for the Communications Platform to implement additional protocols, namely TAPI protocols. No additional physical inputs are shown in FIG. 1a for implementation of these TAPI protocols, because TAPI is a software-based protocol so the software command can be received via the Ethernet "command/control" network interface. Moreover, it is possible for multiple TAPI protocols to be supported by this port and the Communications Services Provider Application, including a Custom Telephony API.

As further shown in FIG. 1a, the computer included in the Communications Platform also has installed on it telephony API Agent software, in accordance with one aspect of the present invention. In this embodiment, the telephony API Agent software is configured to communicate with the Communications Services Provider Application via either of two kinds of telephony APIs: a telephony API directly supported by the Operating System (which would normally be for a Microsoft operations system, Microsoft's TAPI 2.x or TAPI 3.x), or by a custom telephony API, which would typically be specified by the manufacturer of the Communications Platform. Either type constitutes a telephony applications program interface operable to receive commands to thereby control a telephony communication through a Communications Channel.

As shown in FIG. 1a, the Communications Platform has multiple channel endpoints. The object of the present invention is to test the capabilities of the Communications Platform. Accordingly, the opposite endpoint of each channel to be tested is connected to an Agent that can communicate using the same protocol as the particular channel from the Communications Platform to which it is connected. Those of skill in the art will appreciate that multiple channels can be handled by a single physical jack or connector, so the number of channels controllable by the Communications Platform is usually greater than the number of physical jacks or connectors. For example, it is possible that all of the three IP Interface Protocols shown in FIG. 1a, plus the command/control interface, could use a single Ethernet port on the Communications Channel.

As noted above, some of the Communications Channel endpoints will be connected to Agent devices. These will typically be computers outfitted with communications testing devices, such as bulk call generators, corresponding to the Interface Protocols of the Communications Platform under test, such as Intel Dialogic or Natural Microsystems model nos. D/240SC-T1, D/480JCT-T1, D/300SC-E1, DM3 (quad span D/960V or T), D/41ESC(analog) or D/160 (analog). In one embodiment, a Pentium III class computer that is connected to and controls the communications testing device(s) will have installed thereon an Agent, which is software as defined above. Additional Agents may be added to a testing environment to provide higher levels of stress or load testing.

In a typical testing environment, as shown in FIG. 1a, another "Execution Manager" computer will also be connected to the same network to which the Communications Platform is connected via its "command/control" interface. The Execution Manger computer may have installed on it software described further below. The Execution Manager computer may be an Intel or compatible Pentium III, 550 Mhz processor, 256 MB of RAM, a UDMA 100, 20 GB hard drive, a 100 Mbps, full duplex network interface card, and connecting to a network connection using an intelligent switch, and running Windows 2000 Professional, Windows 2000 Server or Windows 2000 Advanced Server with SP2 installed. The Execution Manager computer should be enabled for TCP/IP and NetBios communication. It should also have installed on it a database system, such as Microsoft SQL Server 2000 Desktop Engine (MSDE 2000) or Microsoft SQL Server with Service Pack 2.

In one embodiment, each Agent, (represented in FIG. 1a by the TDM Agent and the IP AGENT) can be detected by the Execution Manager network by broadcasting an IP ping command to a subnet. By default, the Execution Manager software is configured to ping the 192.167.32.xxx subnet. The Execution Manager will attempt to instantiate on each computer responding to the ping, and if it is successful, it means that Agent software is installed on computer having the particular IP address. In one embodiment, the Execution Manager uses the Microsoft DCOM technology to perform the instantiation. In addition, each Agent installed on a remote computer reports to the Execution Manager an identification of the communications resources available to it, such as the number of lines it can access, as well as all information need to uniquely identify a Communications Channel controllable by the Agent, and an identification of an Interface Protocol used by the Agent/remote computer. Software that facilitates this function is included in the computer program listing.

Depending on the amount of processing to be conducted by the test, additional workstations or servers may also be employed, which can reduce the processing overhead of the Execution Manager computer, as described below. Specifically, a separate Results Database server 102 running Microsoft SQL Server may be utilized to store all results of tests, and workstation 103 may be used to monitor the status of tests conducted by the testing server 101.

Those of skill in the art will appreciate that numerous changes could be made to the infrastructure described above. For example, sometimes, the communications platform comprises channel endpoints and a computer that are different pieces of equipment, but which communicate, for example, via an Ethernet or serial port. In this case, the Communications Service Provider Application will be installed on the computer. For such a configuration, the TAPI Agent software would also be installed on the computer. Also, it may be possible to provide a configuration in which the TDM Agent and the IP Agent (or even other Agents for other Interface Protocols) are all installed on a single computer, or even installed on the Execution Manager computer. Moreover, the Results DB Server could theoretically be installed on the same computer as the Execution Manager. However, in view of the processing capacity of computers, such a configuration would likely overload the computer.

Execution Manager Software In one embodiment, the Execution Manager software of the present invention performs the functions described below.

Figure 1B:
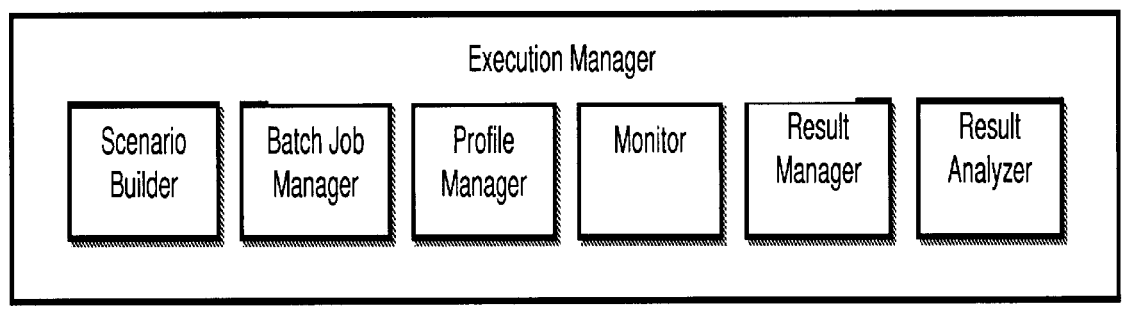
FIG. 1b is a diagrammatic view of an execution manager and portion of a communications platform testing system in accordance with the present invention.
Figure 1C:
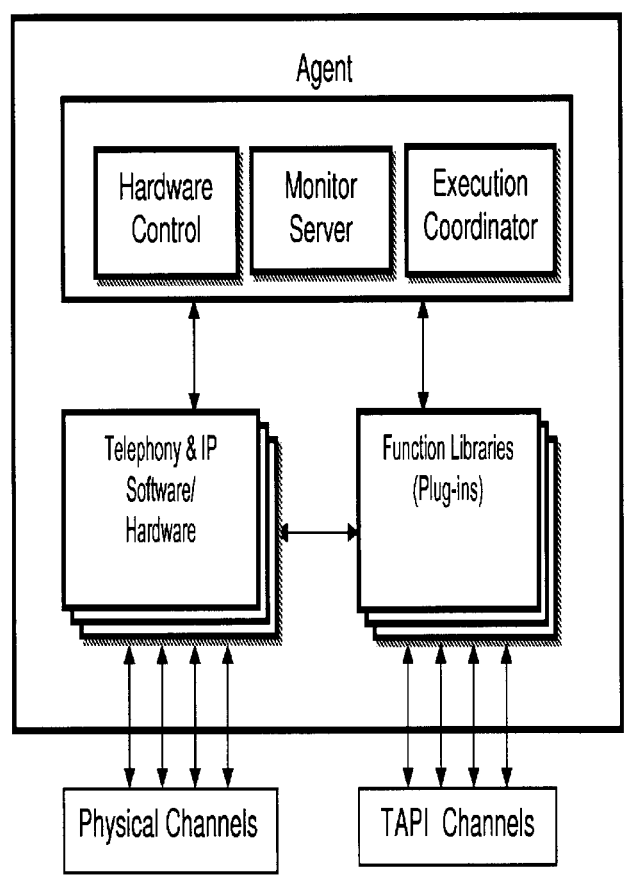
FIG. 1c is a diagrammatic view of an embodiment of an Agent manager portion of a communications platform testing system in accordance with the present invention.

As shown in Fig. 1b, one embodiment of the invention utilizes two types of software: execution manager software and Agent software. The Execution Manager has six primary functions. The Scenario Builder is used to create and save Test Scenarios for the Communications Channels of the communications platform under test. The Batch Job Manager is used to execute a Test Scenario, in part by sending Communications Channel control commands to the communications platform in accordance with a Test Scenario. Some of these control commands may be in accordance with a telephony API. It also receives information regarding the status of the communications platform in response to sending the telephony API Communications Channel control commands sent to the Communications Platform. The profile manager is used to store the configuration of a physical infrastructure of Agents and devices that will be used to conduct execute Test Scenarios. The Monitor is used to watch the status of a Test Scenario being executed. The results manager is a Results Reporter operable to report information regarding the plurality of Communications Channels during execution of a Test Scenario, and is also used to select and display the results of a Test Scenario. The Results Analyzer module is generate information form the Log Data regarding the execution of each Test Sequence associated with a Communications Channel. In addition, it can generate statistics regarding the execution of all Test Function Sequences, and display Log Data for any Test Function associated with a Test Function; the generated information regarding each test sequence; and the generated statistics regarding the execution of the Test Function Sequences. It is also used to specify desired thresholds and pass/fail/warning criteria, so that different criteria can be applied to the same Test Scenario data for analysis purposes.

The user interface is divided into two main modules, an execution manager, and a results analyzer. However, those of skill in the art will appreciate that the functionality described below could be easily combined into a single module or broken up into more than two modules. In one embodiment, the software components are written in Visual C++ to run under the Microsoft Windows 2000 operating system. Although the screens, prompts and other features through which a user interacts with the system are described below, those of skill in the art will appreciate the invention may be practiced using different operating systems or computer screens or menus than those shown. Accordingly, the embodiment described is only illustrative, and not intended to limit the scope of the invention.

Figure 11:
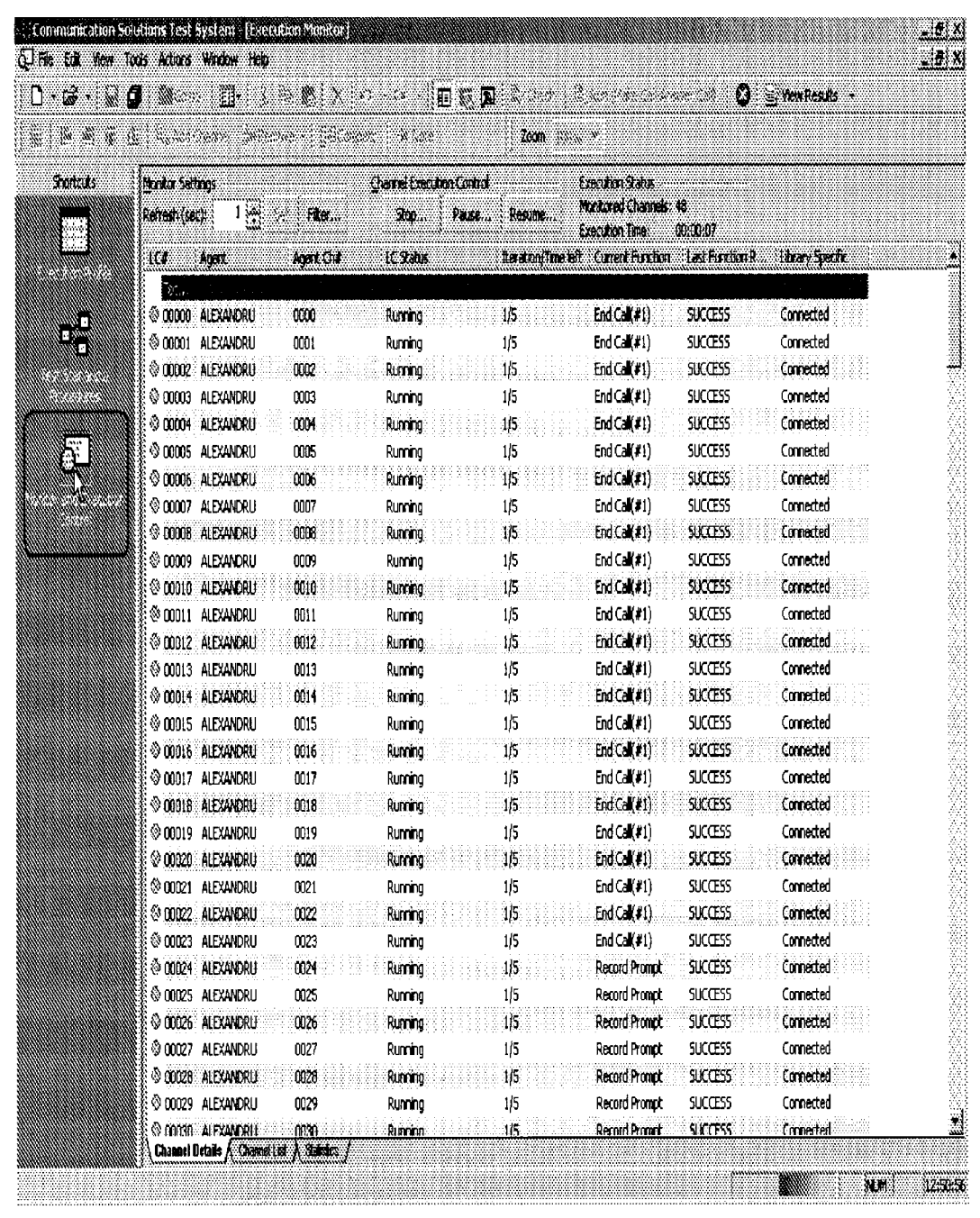
Figure 12:
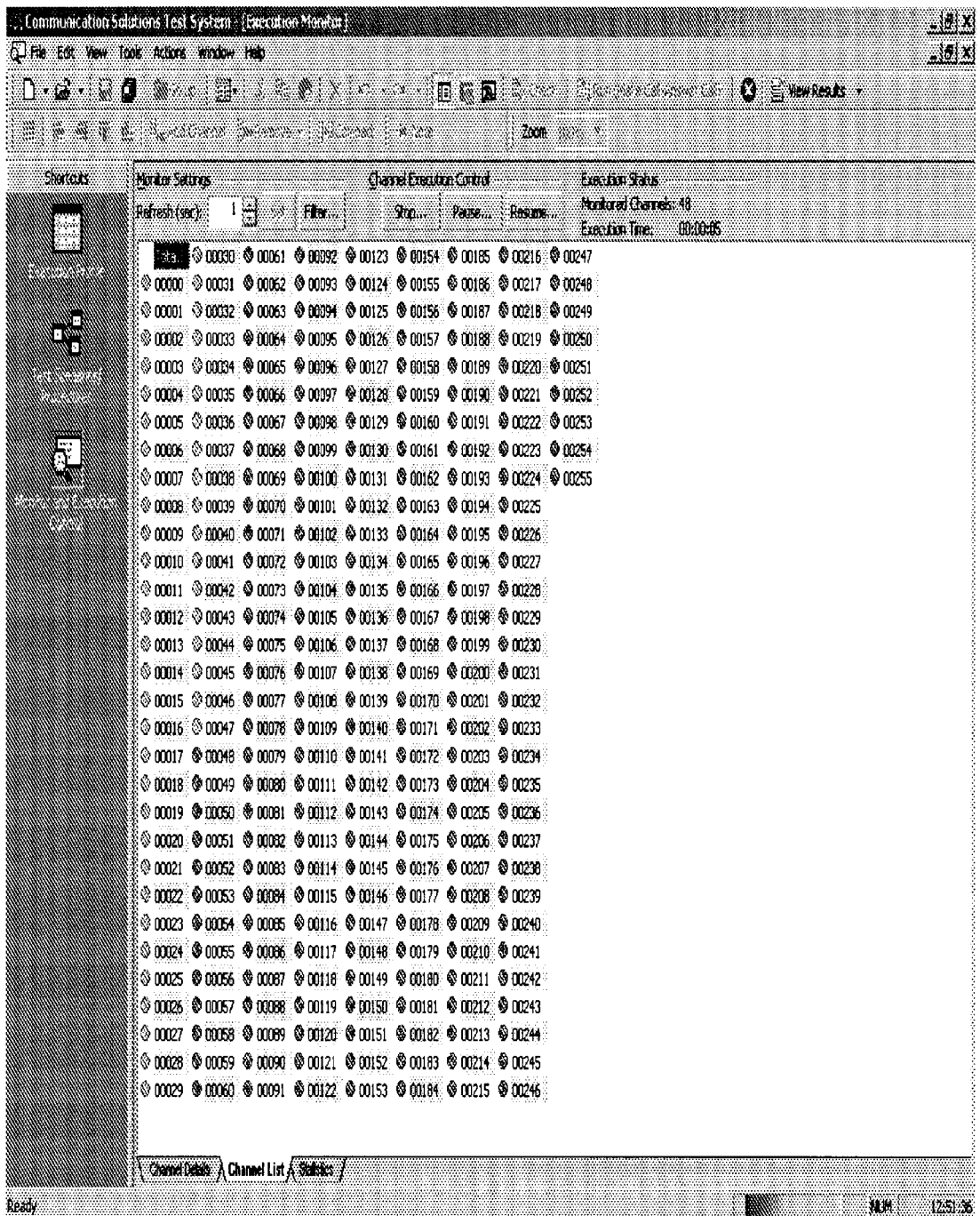
FIG. 12 is a view of a graphical user interface for a communications testing system showing a window for compactly displaying a list of all channels in a Test Scenario.
Figure 13:
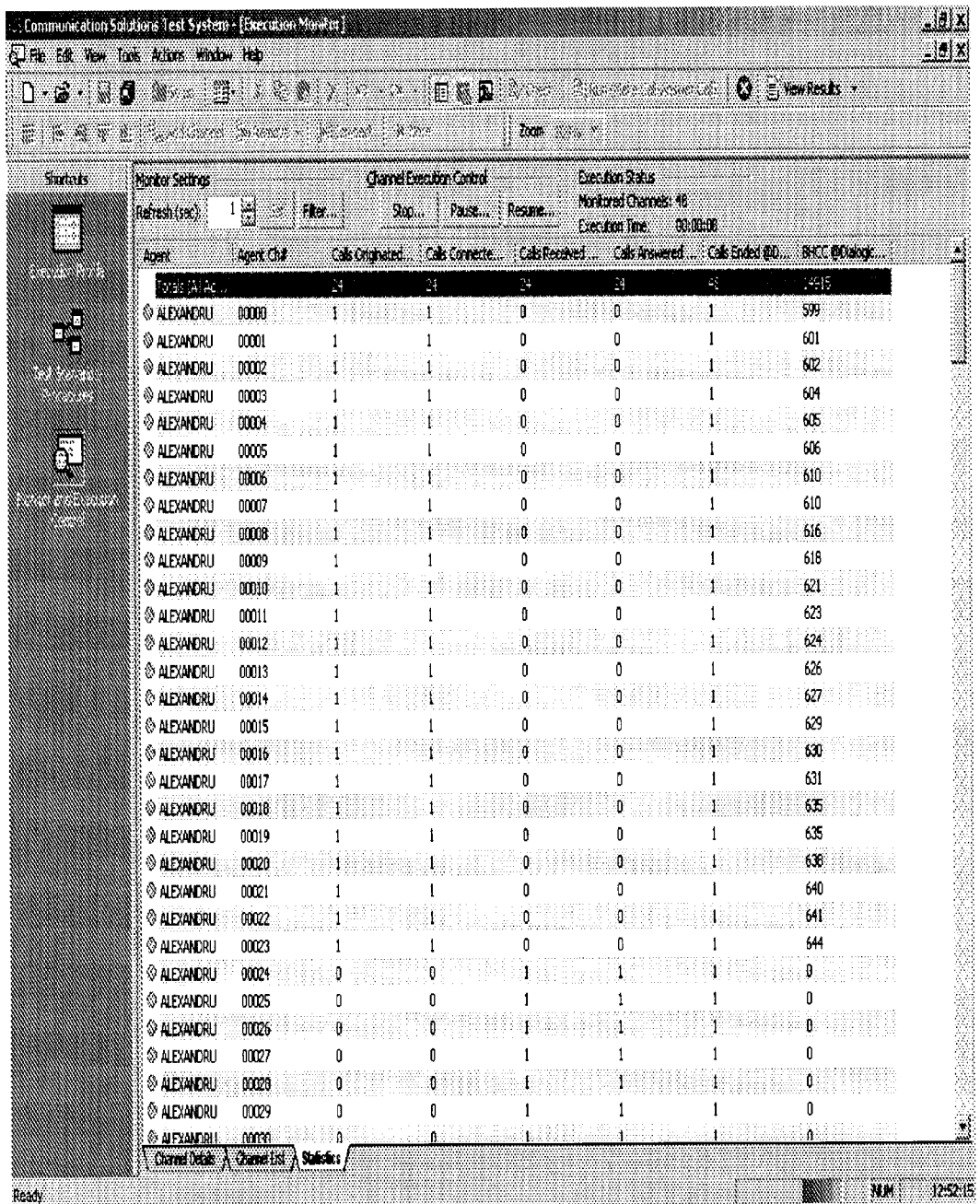
FIG. 13 is a view of a graphical user interface for a communications testing system showing collected statistics relating to Communications Channels during execution of a Test Scenario.

In one embodiment, the first module is referred to as the "execution manager." The main window of the execution manager, shown in FIGS. 11–13, displays the following areas:

Execution Profile editor—the user can edit execution profiles by mapping the Test Scenarios on different Logical Channels and hardware configurations.

Test Scenarios/Procedures editor—the user can edit the Test Scenarios by adding script functions and interconnecting them on different Logical Channels.

Monitor and Execution Control area—the user can inspect the execution and retrieve statistics about the execution on different channels.

The user may switch between these areas by selecting the corresponding button from the Shortcuts toolbar (rightmost pane).

The Execution Profile Window

An execution profile consists of:

The testing software System Agents that are involved in the Unified Profile. Each Agent has an associated number of channels and specific engines, depending on the hardware resources available to the computer on which the Agent is installed/connected to. Each engine represents a telephony API or protocol, such as a Dialogic board or IP phone (VoIP).

The Logical Channels that will support the execution of the Test Scenario. These channels will be assigned some specific runtime parameters.

Figure 3:
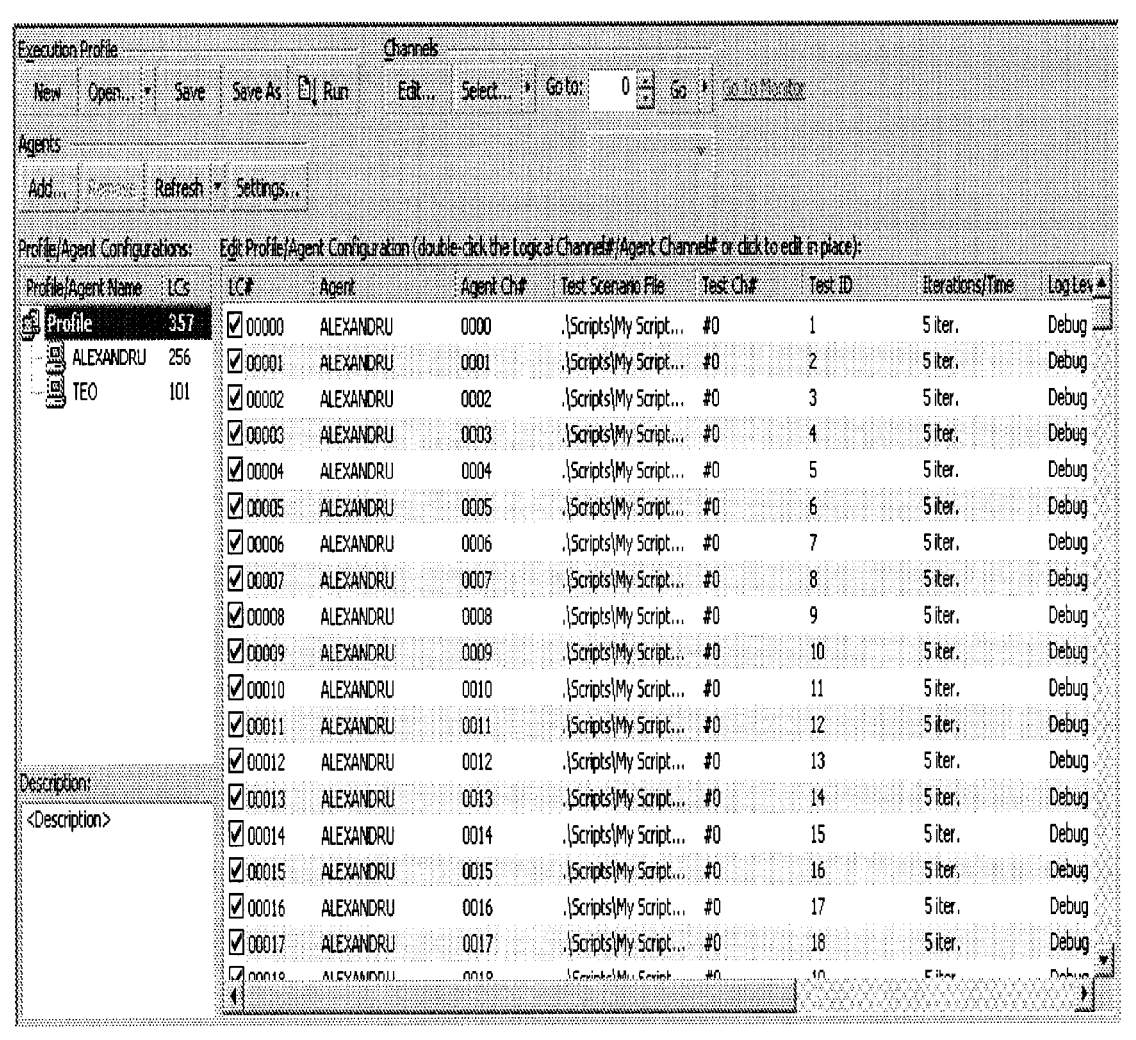

FIG. 3 shows an exemplary execution profile window of the present invention that allows modifying all the runtime parameters assigned to a channel and allows selecting computers have Agents installed thereon. In FIG. 3, two computers (ALEXANDRU and TEO) have been selected to be in the profile. The ALEXANDRU computer has 256 Logical Channels, and TEO has 101 Logical Channels, for a total of 357. The execution profile defines the conditions for running the Test Scenarios. An execution profile may be loaded (Open button) or defined (New button). The Test Scenario execution will involve the Unified Profile, i.e. a profile made up of all the profiles associated to the Agents selected as belonging to the current Unified Profile. The information that may be specified may include the following:

After selecting the agent(s), you can start editing the execution profile by allocating to each selected logical channel number (LC#) the following resources and capabilities:

Agent—the computer that contains the execution required resources

Agent channel number—the agent channel that is currently mapped to the current logical channel Test scenario file—the path and filename to the file (*.tst) that contains the test scenario to be executed on the current logical channel Test channel number—indicate the reference test scenario channel (which is one of the channels edited in the current test scenario) to be executed on the current logical channel Test ID—the "instance" of the test scenario within the execution profile. It is used in case the test scenario is a multi-channel scenario. Usually the Test ID field value is under application control. It may be necessary to manually edit its value only in case the application fails to correctly generate the Test ID value. Every time you need to generate Test ID values (this is necessary whenever a multi-channel test scenario have be mapped on logical channels), use the application provided Edit feature (click the Edit . . . button and make sure the Automatically Generate Test IDs option is checked, then click Apply).

Execution time or Number of Iterations—the user may specify the number of iterations/time the current test will be executed on this logical channel.

Log Level—enable a specific log level option. The user has multiple options to specify the quantity of information that will be logged from brief execution information to detailed debugging logs. In order to optimize the time necessary to user for accessing the results, the preferred embodiment provides the possibility to choose between different Log Level Details. For example, if a system is used only for its traffic generation capability and the user is not interested in receiving any execution results, it may choose the "None" option. The "Errors only" level will extract only the errors from the execution logs and "Normal" will display the errors and the critical events encountered during the execution. The "Debug" level presents all the information acquired during the execution including the errors, the events and all the parameters for the executed functions.

Collect scheme—specify the components of the execution log to be collected on the specified channel. They can be displayed as function execution data (function execution logs and/or script function parameters) or statistic counters and timing benches. In one embodiment, the following options may be selected:

Function Execution Data—display only the executed functions with start/end date parameters and the returned status (SUCCESS of FAILURE) in the execution results. The following options may be specified for this parameter:

a) Execution Log—display the executed functions with start/end date parameters, the returned status and the log data for each function in the execution results b) Script Function Parameters—display the executed functions with start/end date parameters, the returned status, the log data and function parameters for each function in the execution results.

Statistic Counters and Timing Benches—include the values of the user defined counters and timers in the final execution results. Their values are retrieved from the results database server and displayed in the Channel Results logs. They may be also used to define a post execution analysis profile from the Results Manager application.

Delay before first iteration—specify a static, random or linear delay value (in ms) that will be applied to the current Logical Channel each time before a new execution start.

Delays between iteration—specify a static, random or linear delay value (in ms) that will be applied between the execution iterations.

Figure 34:
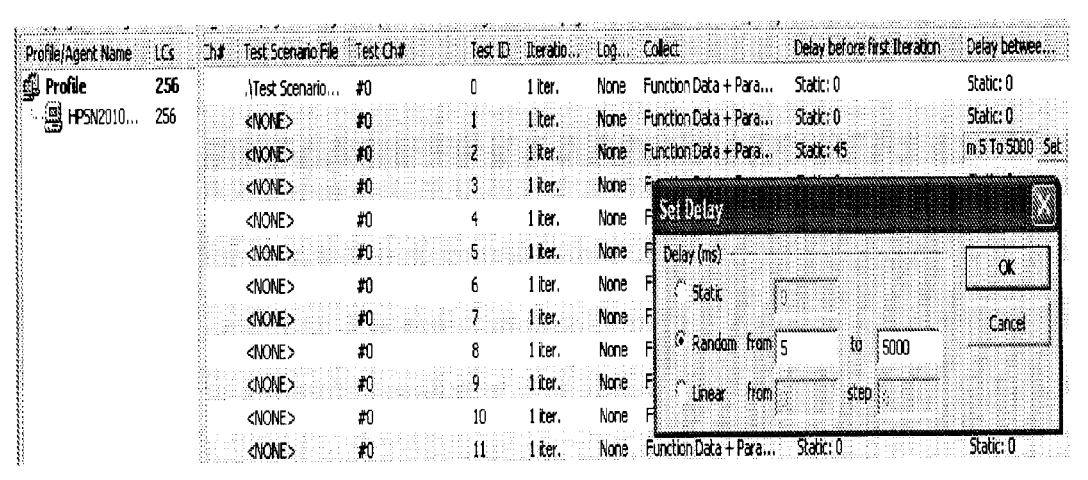

If delays are specified for either of the last two parameters, Delay before first iteration, or delays between iteration, this constitutes a Time Profile for the Test Sequence of the channel. FIG. 34 shows an exemplary user interface for specifying a Time Profile. When a logical channel row is highlighted and a the entry for the row in the Delay before first iteration is selected, a "set" button is displayed which, if depressed, displays a Set Delay dialog box. In this box, either a static, random or linear time delay may be specified. An identical user interface may appear for the previous column in FIG. 34, the Delay before First iteration column.

The information about the execution plan viewable from this pane may be changed by clicking any cell. The information includes, the Logical Channel number, the name of the Agent (the name of the computer reported by the network), the Agent channel number (each Agent has at least one channel, and is numbered sequentially beginning with number 0), the file name and path to the Test Scenario file that will be associated with the channel (if any), the test channel number (each Test Scenario may have multiple channels in it, beginning with 0, and this number indicates which channel in the Test Scenario file will be associated with the Logical Channel), the test ID number (which is assigned for analysis purposes), the iteration information (a number, indicating either the number of times the Test Functions for the channel in the Test Scenario will be executed, or the duration of time (e.g., 1 minute) for how long it will execute), the Log Detail Level, indicating how much information will be captured/recorded (either none, quiet, verbose or debug), the designator of which information will be collected during execution for this channel (see FIG. 9), the duration of the delay before the first execution of the Test Scenario for the channel (in milliseconds, which may be static, random or linear); and the duration of the delay that will be applied between iterations of the test scheme (in milliseconds, which may be static, random or linear). IT will be appreciated that the effect of specifying a Test Scenario file and a Relative Channel (the Test Ch# column in FIG. 3) for a Logical Channel (the LC# column in FIG. 3), is, that the Test Functions defined within the Test Scenario file for the specified Relative Channel of the Test Scenario will be associated with the identified communications resource of an Agent. This is because, as shown the FIG. 3, each Logical Channel (the LC# column) has been assigned to a specific Agent and Agent channel number (the Agent Ch# column). Accordingly, a particular Test Function is associated with a Relative Channel of a Test Scenario, the Test Scenario is associated with a Logical Channel, and the Logical Channel is associated with a specific Agent and Agent Channel Number, and the Agent Channel Number is associated with a specific communications resource. Those of skill in the art will further appreciate that this is but one embodiment. For example, some test systems do not use multiple Agents or remote computers, or have only a single list of communications resources of the communications platform. In such instances, the concept of Logical Channels is not as important. Nevertheless, a Relative Channel of a Test Scenario could still be associated with a communications resource.

Figure 4:
FIG. 4 is a view of a graphical user interface for a communications testing system showing an Agent profile.

Each Communications Solutions Test System Agent has associated hardware (engines) and provides a number of Logical Channels, as shown in FIG. 4. The channel parameters describe the identification data (e.g. the Logical Channel number, the Agent alias) and the channel runtime characteristic values (e.g. iterations, log level, delay before start, and delay before iterations). The Edit button may be pressed to access the channel properties.

Figure 5:
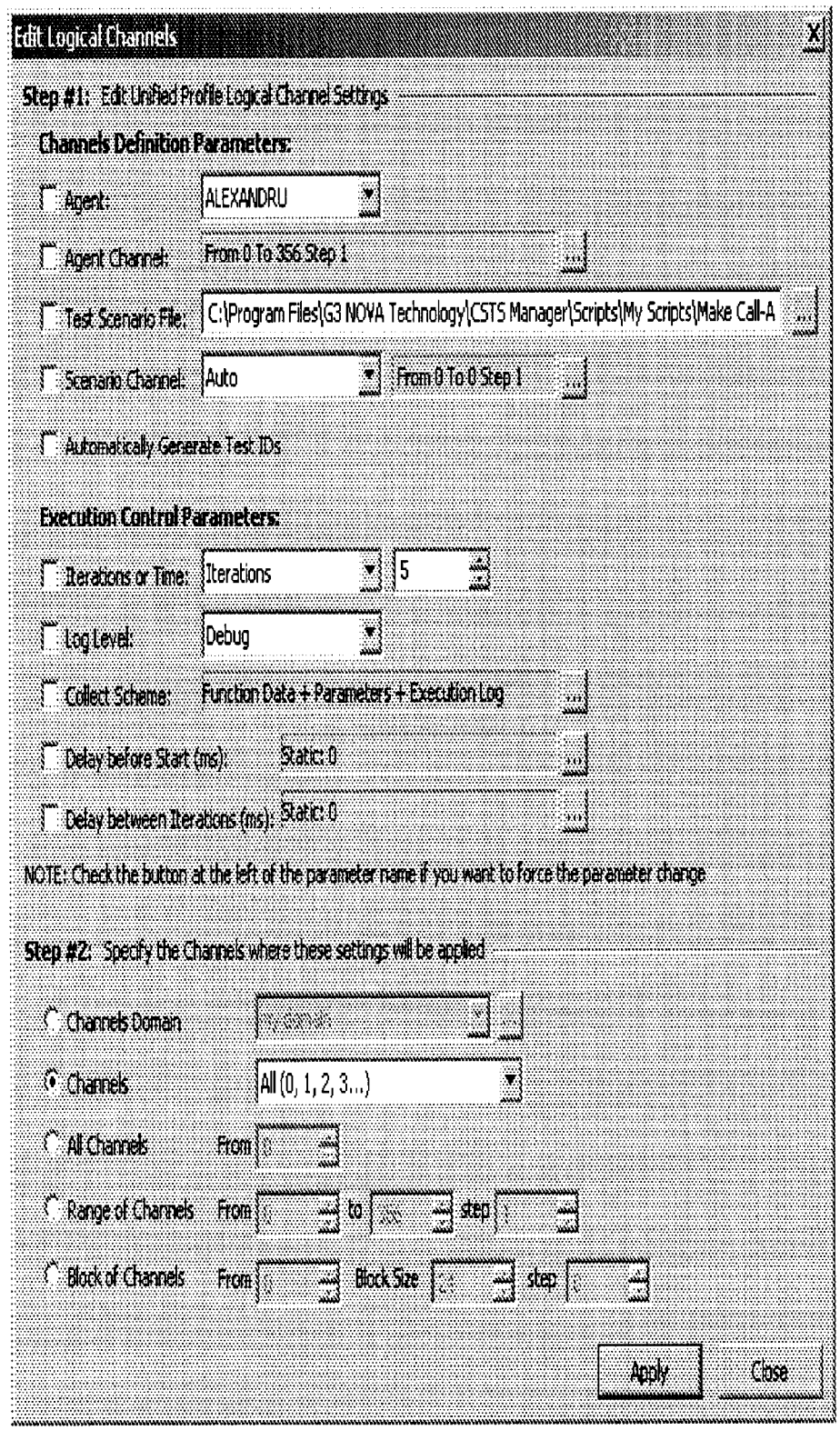
FIG. 5 is a view of a graphical user interface for a communications testing system showing a dialog input box for editing Logical Channel settings.

As shown in FIG. 5, the Edit Channel Properties screen allows:

Selecting a certain number (domain, range, block) of channels.

Choosing the Remote Testing Unit for which the actual modifications will be considered.

Assigning a Channel of a Test Scenario to specific channels.

Setting the number of iterations or the time the execution will last.

Set the Log level to None, Quiet, Verbose or Debug. This setting will change the level of the in-depth details of the execution process.

Association of a delay before start, to the selected channels. This delay may be static, random or linear.

Association of a delay between iterations on the specified range of channels.

Defining an Execution Profile Execution of a Test Scenario should be done according to an execution profile. When opened for the first time, Communication Solutions Test System does not have any profile to load. As soon as a profile is defined the Test System will load the last saved profile. A new Execution Profile may be created as follows.

1. Press File|New|New Execution Profile to define an execution profile. This execution profile will have to be added Agents (Remote Testing Units), and for each channel the runtime parameters must be defined. The window allows adding Agents to the Execution Profile and defining the parameters representative for each channel all along the execution session.

Figure 7:
FIG. 7 is a view of a graphical user interface for a communications testing system showing a window for allowing the selection of Agents for inclusion in an execution profile.

2. Next, the user presses the Add button highlighted in the upper figure. This will open the Select Agents window depicted in FIG. 7. The localhost computer is already present.

Figure 8:
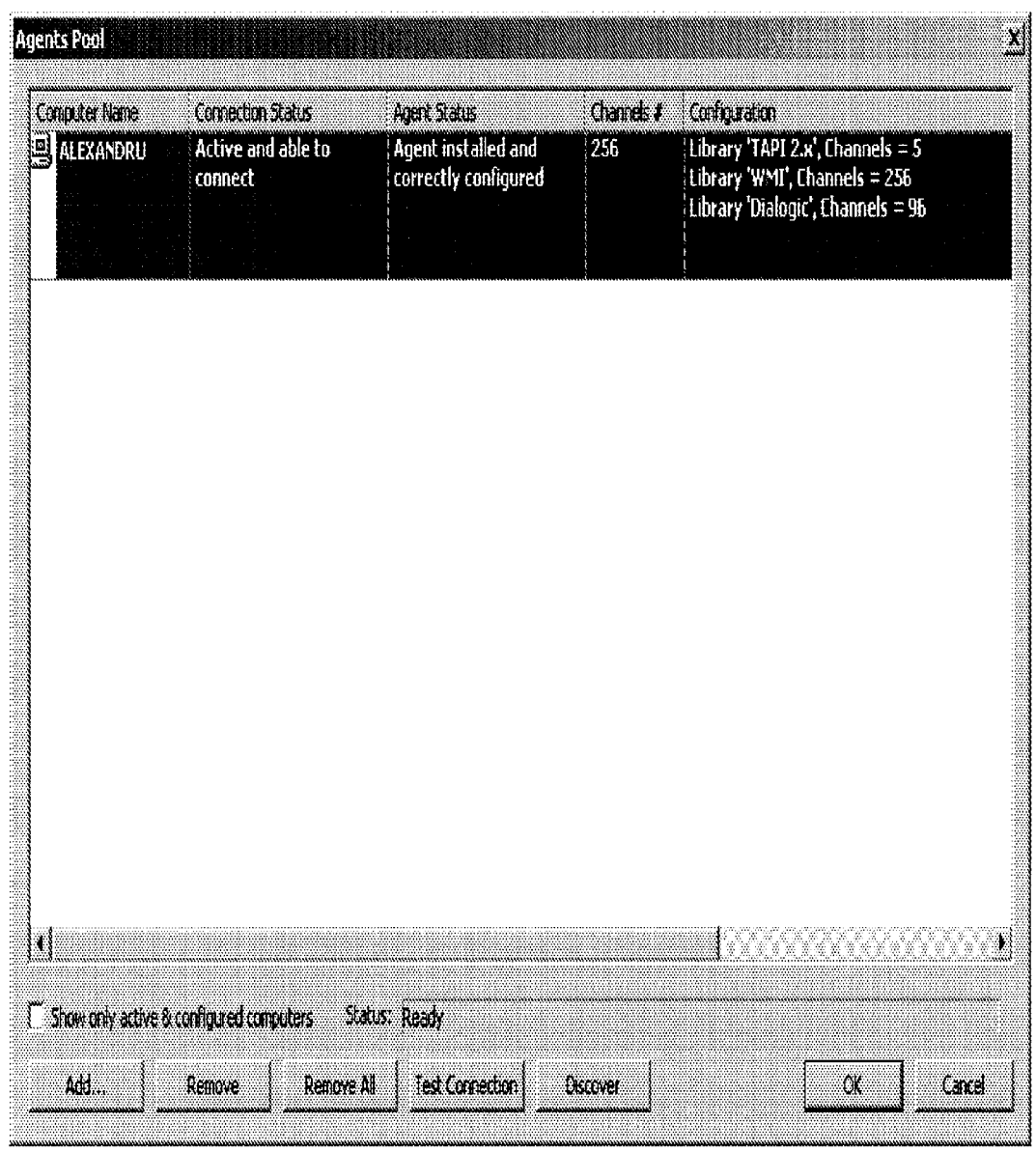
FIG. 8 is a view of a graphical user interface for a communications testing system showing a window for displaying a summary of Agent data for Agents included in an execution profile.

3. Next the user presses the Agent Pool button. This will open the window, shown in FIG. 8 that allows managing the Agents that will be part of the Unified Profile for the execution. Initially, there is only one Agent, the localhost computer. As shown in the rightmost pane of FIG. 8, the Interface Protocols each Agent can utilize are displayed. In the example shown in FIG. 8, the localhost computer has installed on it dlls that will allow it to communicate via TAPI 2.x, WMI, and Dialogic Interface Protocols.

4. Next, the user presses the Discover button to scan the local area network for Communications Solutions Test System Agents or use the Add button to browse for an Agent.

5. Next, the user presses the OK button once the scanning, or browsing for Agents, is complete.

6. The Select Agents window will show all the RTUs (if the Discover Agents option was chosen). To the extent there are other RTUs on the network, each will be listed, and for each RTU, a list of the Interface Protocols the RTU supports will be listed. The process by which the Execution Manage identifies the Agents and the Interface Protocols they support is further discussed elsewhere herein. The user may then select the Agent(s) to be used in the unified profile, and press OK. Those of skill in the art will appreciate that only those RTUs necessary to implement a particular Test Scenario need to be selected.

At this point the Agents in the Execution Profile are set. The next step is to select the channels that will support the execution and to assign them specific runtime parameters. As an example, the steps below will assign the Make Call and Play Prompt tasks from the previously defined Test Scenario, to the first 24 channels (1st Span) and the Receive Call and Record Prompt to the next 24 channels (2nd Span).

Figure 6:
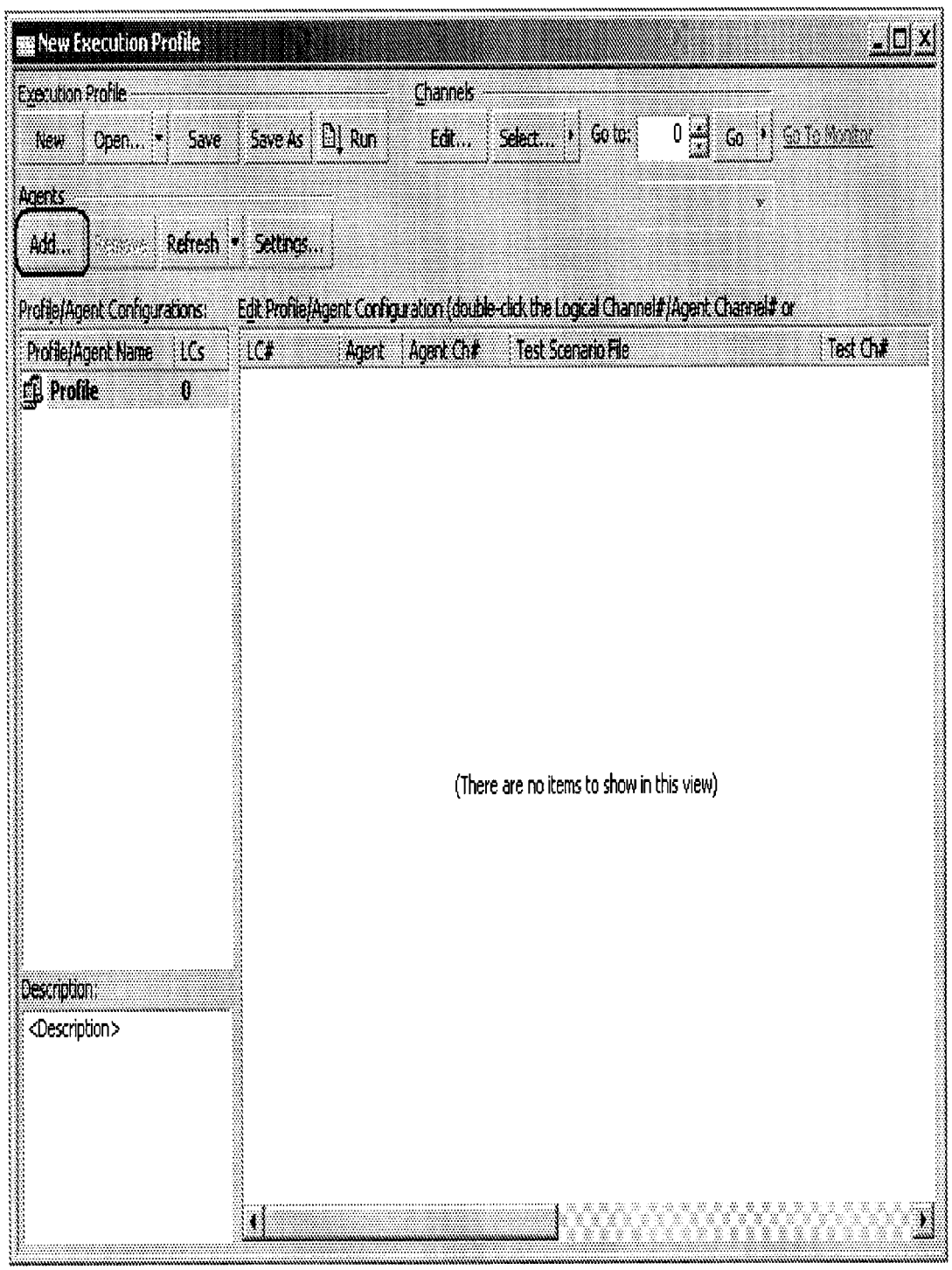
FIG. 6 is a view of a graphical user interface for a communications testing system showing a dialog creating a new execution profile.

1. Press the Edit button on the Execution Profile Window (FIG. 6) to display the Edit Logical Channels screen (FIG. 5).

2. Select the Communication Solutions Test System Remote Testing Unit to modify the runtime parameters for its Logical Channels. Use the Agent Alias pull-down menu.

3. Select the Test Scenario file Make Call—Answer Call previously defined.

4. Set the Scenario Channel to Specified and select Scenario Channel #0. Enable the Automatically Generate Test Ids check box.

5. In the Execution Control Parameters, set the parameter in the Iterations or Time to Execute to Iterations and the value to 5. Change the Log Level to Debug.

Figure 9:
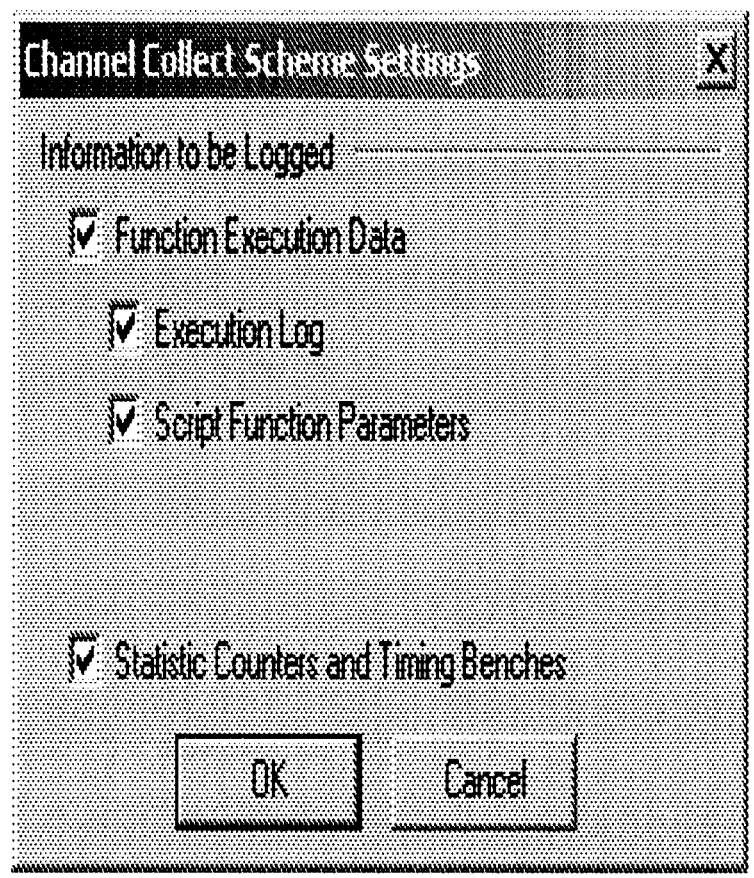
FIG. 9 is a view of a graphical user interface for a communications testing system showing a window for specifying the data that should be collected during execution of a test scenario.

6. To modify the Collect Scheme, press the ( . . . ) button on this line. This will open the Channel Collect Scheme Settings window (FIG. 9). Enable all the check boxes in this window and press OK.

7. Returning to the Edit Logical Channels screen, select the range of channels, from 0 to 23 (1st Span), to which these settings will be applied.

8. Press the Apply button.

9. Select test Scenario channel 1 in the Scenario Channel option.

10. Assign the selected scenario channel to the 2nd Span of the Dialogic board, choosing in Range of Channels option the interval from 24 to 47.

11. Press the Apply button.

12. Press Close button to exit this Edit Logical Channels window. At this moment the runtime parameters of the channels are defined. In order to verify if the parameters are correctly defined press Check button on the Main Toolbar.

13. Press the Save as button in order to save this execution profile. Before running the testing scenario, the user may choose Tools|Global Settings to enable the option that allows saving the results in a database if any result post processing is required. If not, enable only the option Save results in local binary files.

Figure 10:
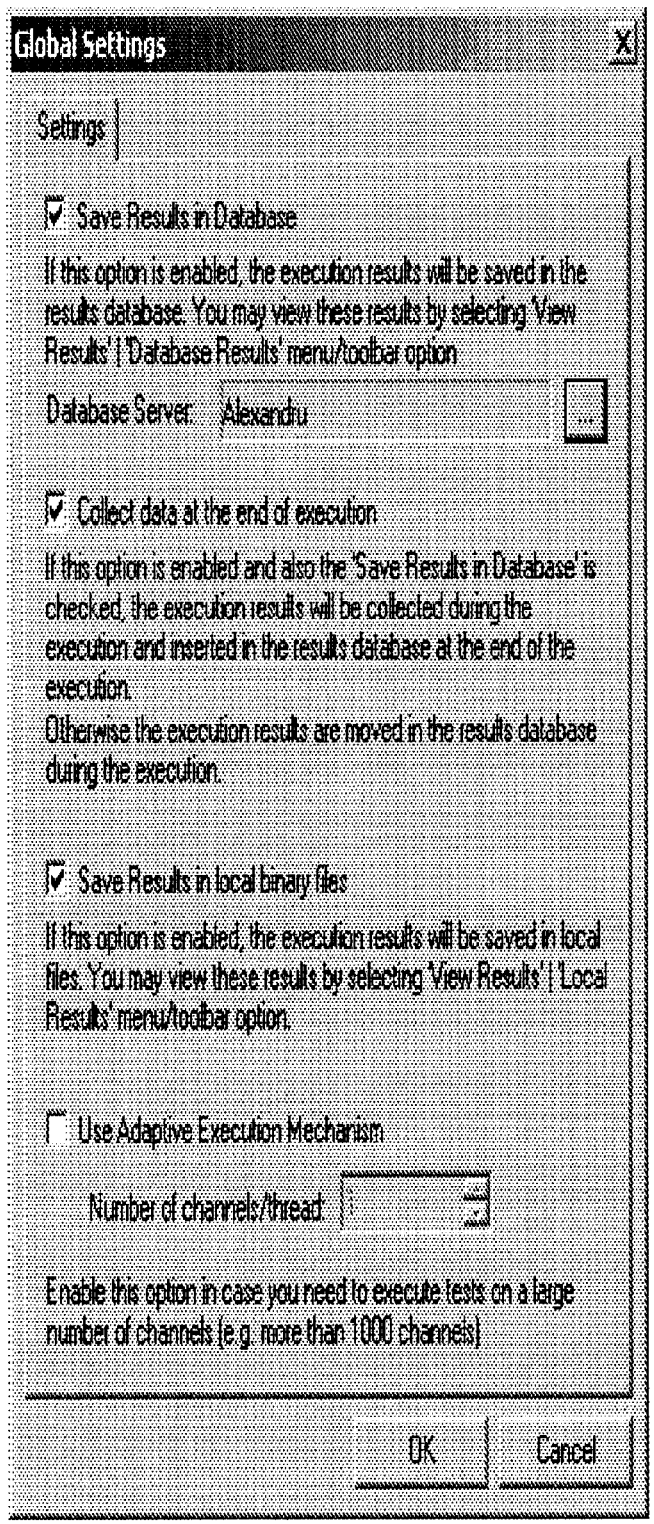
FIG. 10 is a view of a graphical user interface for a communications testing system showing a window for specifying how and where data from execution of a Test Scenario should be collected.

FIG. 10 shows the options available in order to selectively record for Log Data associated with the execution of each Test Function; for example, saving Test Scenario results on either a remote computer on which the Agent is installed, or the computer holding the results database. The results saving options affords the user considerable flexibility in performing tests. For tests involving a few Agents or which are not expected to generate significant amounts of test data, it will be preferable to save have the Agents store their results on the primary results database. However, if the test is expected to generate significant amounts of data, the user may specify that the results should be saved in a local on the computer on which the Agent is installed. This option will reduce network traffic, and the processing overload for the Agent workstation to communicate with the database server, which will give the testing system better capacity to devote resources on executing the testing scenario. Another option is to select the "Collect data at end of execution" checkbox. If this is selected and the "Save results in database" option is also selected, the Agents will store the results locally, and then upon completion of the test, the results from the Agents will be copied to the results database. This option reduces processing and network overhead during test execution, and still provides for comprehensive analysis of the results from all Agents via the results database.

Scenario Builder

The Test Scenarios are edited with an extremely easy to use and powerful Test Scenario Editor. No programming knowledge is necessary.

A Test Scenario may be created, edited and saved using the Scenario Builder module. Test scenarios are combinations of two or more Test Functions. In one embodiment, Test Functions are grouped by Interface Protocol, and all Test Functions for a given protocol are stored in a .dll file which comprises a "function library" for that protocol. For example, separate function libraries may exist for different Interface Protocols such as TAPI 2.x, T1/E1/Analog, CDR, M.100, S.100, S.410, CSTA, JTAPI, TAPI 3.x, WMI, and XoIP: Voice (H323, SIP, RTP). Importantly, the present system is designed to accommodate future protocols that may be developed in the future. Such protocols may be reflected by a Dynamic Link Library (.dll). All .dll files representing protocols that may be tested under the present invention may be stored in the main program file directory in which the software is installed on test server 101, such as "C:\Program Files\G3 NOVA Technology\CST\," and registering the file. As described further below, the system scans for all such protocol .dll files, and all files identified are automatically presented in the scenario builder user interface for the user to access to create, edit and execute Test Scenarios. This architecture make the testing system of the present invention ideally suited to persons that have a new, unique or proprietary protocol they wish to tests. Accordingly, the present invention is highly adaptable to changing telecommunications interfaces, protocols and equipment.

In addition, the invention includes Test Scenario flow-control functions in a pre-defined function library. This library includes functions such as start, stop, variable set, variable test, sleep, procedure initiation and exiting, counting, and timer stopping and stopping. In general the graphical user interface for building Test Scenarios, including the drag and drop capability, is known in the art as reflected, for example in Microsoft's Visual C++.

The Test Scenario Window

Figure 32:
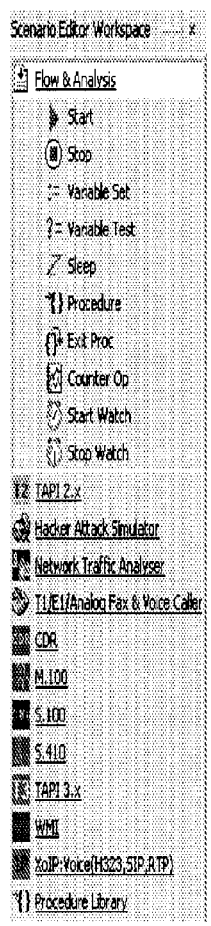
FIG. 32 is a view of the Scenario Editor Workspace with "Flow & Analysis" functions displayed.

A Test Scenario represents a real world situation and is represented by function blocks that allow a reconstruction of the real life scenarios. The Test Scenario window may be accessed by pressing the Test Scenario/Procedures second button on the Shortcuts bar (the leftmost pane of FIG. 2a). This window allows the user to view and modify a Test Scenario or to construct one from scratch, using the function blocks in the Scenario Editor Workspace (the rightmost pane in FIG. 2a. A version of the Scenario Editor Workspace with "Flow & Analysis" functions displayed appears in FIG. 32

Figure 2A:
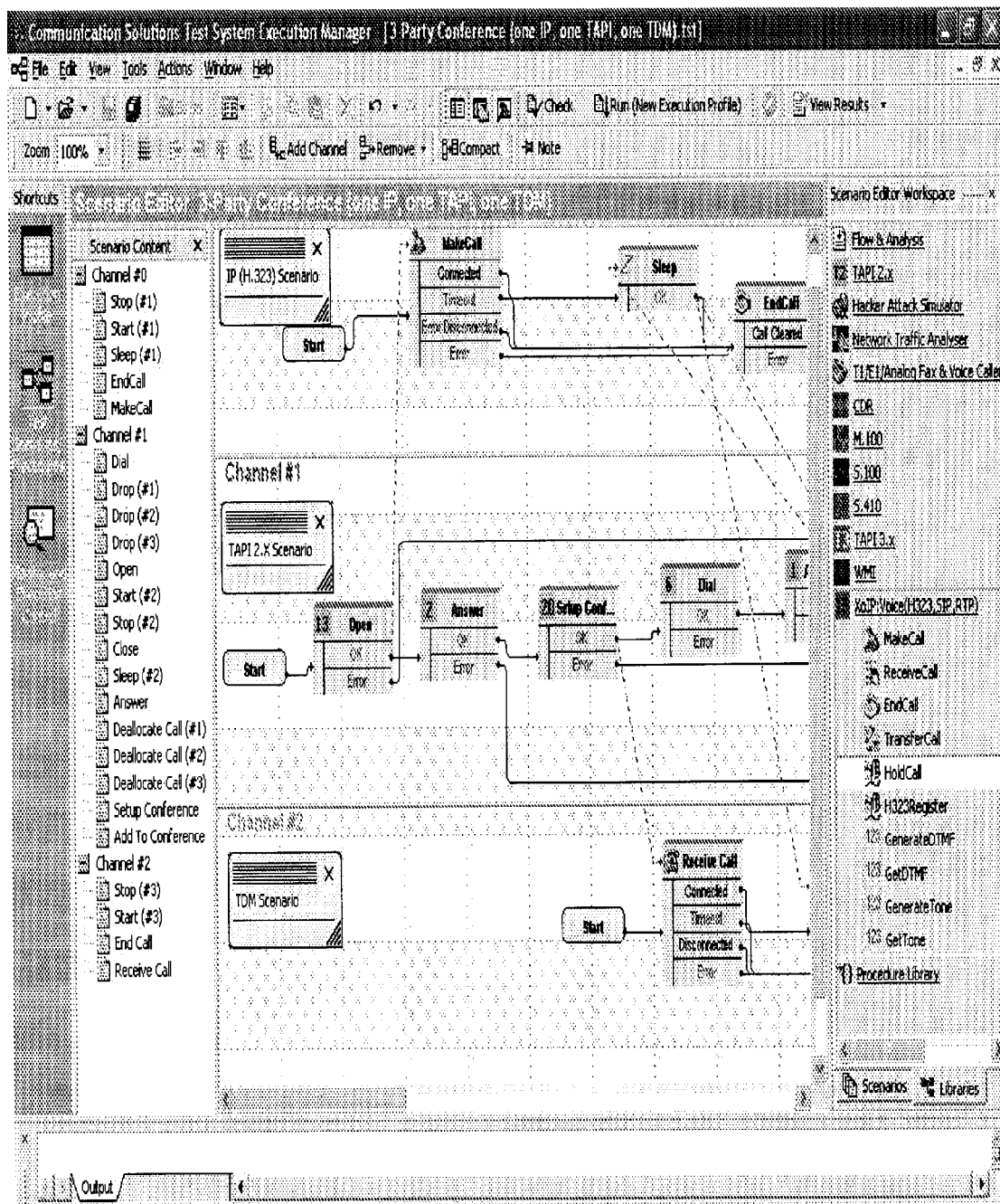
FIG. 2a is a view of a graphical user interface for a communications testing system showing a scenario builder.

The Scenario Editor Workspace shown in FIG. 2a includes a collection of function libraries that contain Test Function blocks that will be used while creating/modifying a Test Scenario. There will always collection of Test Functions under the heading Flow & Control, which contains the following: Start, Stop, Variable Set, Variable Test, Sleep, Procedure (enter), Procedure (exit), Counter Operation, Start Watch and Stop Watch. In addition, multiple Test Functions that may be repeatedly used in different Test Scenarios may be stored as a procedure. When a procedure is inserted into a Test Scenario, it becomes easier to read and understand, providing though a better handling of the Test Scenario creation.

The remaining sets of Test Functions are from the .dll libraries for the different Interface Protocols installed on the execution manager.

Figure 2B:
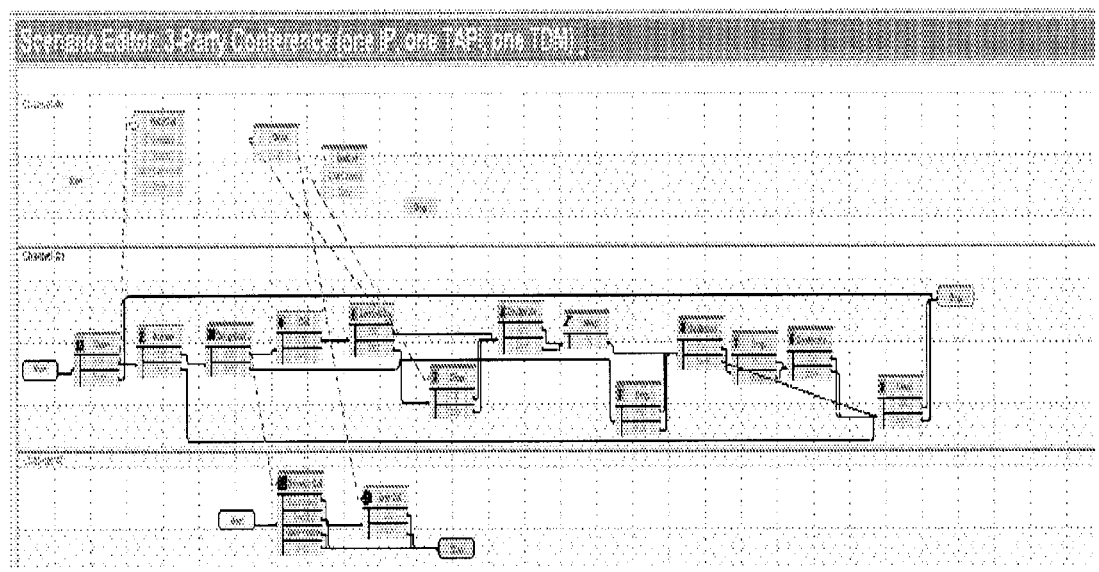
FIG. 2b is a view of a graphical user interface for a scenario builder showing all the test functions for a three channel test scenario.
Figure 2C:
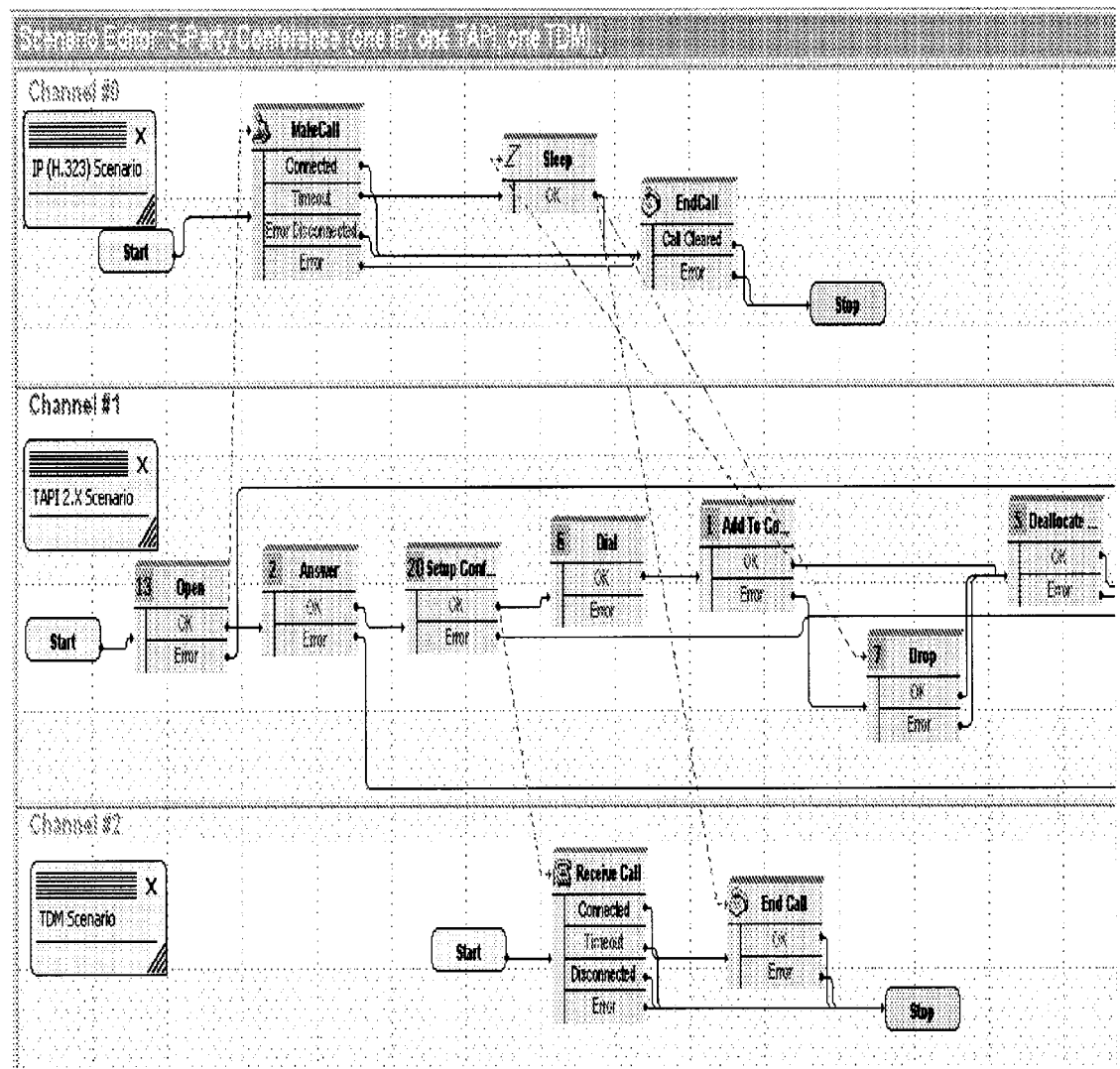
FIG. 2c is a view of the left half of the test scenario shown in FIG. 2b.
Figure 2D:
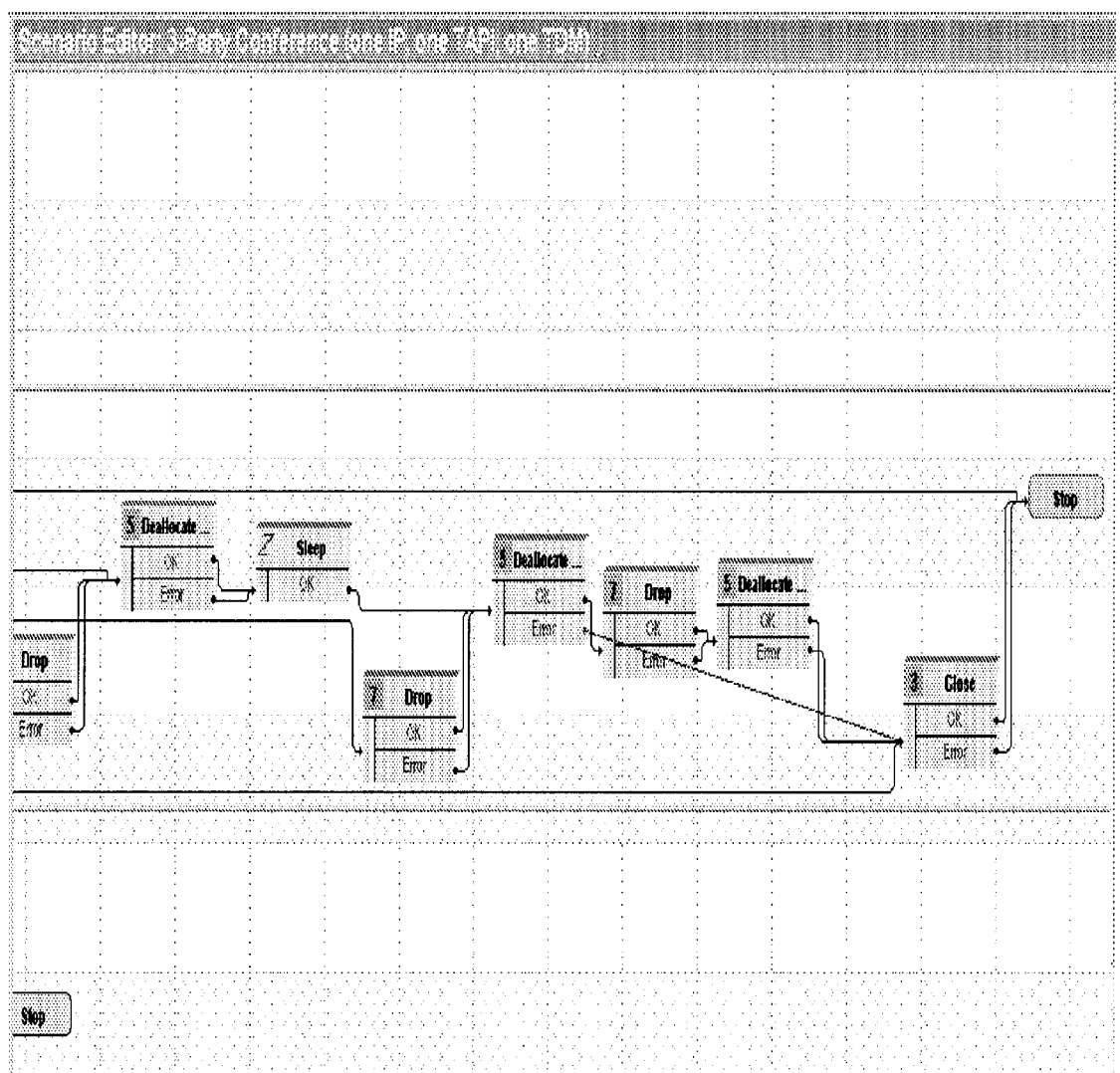
FIG. 2d is a view of the right half of the test scenario shown in FIG. 2b.

FIG. 2b shows all of the Test Functions of a representative Test Scenario for simulating a conference call. FIGS. 2c and 2d show the Test Scenario of FIG. 2b in greater detail. This Test Scenario implements the functions of creating and terminating a three way conference call using phones controlled by three different Interface Protocols. Channel 0 uses an IP (H.323) Interface Protocol, channel 1 uses a TAPI 2.x Interface Protocol, and channel 2 uses a TDM interface.

Creating a new Test Scenario A Test Scenario represents a real world situation simulated on the computer, using function blocks that allow a neat reconstruction of the real life scenarios. A Test Scenario may be made up of interconnected function blocks, belonging to the same or to different libraries. In the Test Scenario the user may also add procedures. A procedure is a set of interconnected function blocks or even a Test Scenario, with a known output, hidden beside a single block. General methods for defining a Test Scenario using a graphical user interface are well-known to those of skill in the art. For example, techniques for graphically displaying channels, and dragging and dropping Test Function icons for a single Interface Protocol and connecting those icons, are well-known. Accordingly, the details for performing this function are not the focus of this invention and are not repeated herein.

In the following example, references are to FIG. 2a unless otherwise indicated, and the steps show placing a 3-Party conference call on three different channels using the following steps:

1. From Press File|New|New Test Scenario on the Main Menu. Press the Add Channel Button three times to create channels 0–2, each of which will by default have start and stop functions.

2. In the Scenario Editor Workspace, click XoIP icon to expand it to show the graphically displayed icons shown in FIG. 2a, which represent Test Functions. These Test Functions represent control functions for controlling a Communications Channel via a Interface Protocol.

3. Drag and drop the Make Call function block onto the Test Scenario Editor area for channel 0. This action constitutes a means for defining, or associating, a Test Function for the Communications Channel.

4. Move the mouse pointer over the Start function block. When the mouse pointer turns into a cross, keep left mouse button pressed and drag a connection to the Make Call function block.

5. Add the Sleep Test Function to the Channel 0 workspace by clicking and expanding the Flow & Analysis title in the Scenario Editor Workspace, and dragging and dropping the Sleep icon onto the Test Scenario Editor area for channel 0. Connect the Make Call and Sleet Test Function blocks by clicking in the timeout section of the Make Call Block and dragging the cursor to the sleet function block.

6. Return to the XoIP function library and add the End Call function block and connect its input to the connected, error disconnected, and error outputs of the Make call Test Function. Next, connect the Call Cleared and Error outputs of the End Call Test Function to the Stop button.

7. For Channels 1 and 2, access the TAPI 2.x and I1/E1/Alalog Fax & voice Caller Test Function libraries, respectively, to create the functions and connections shown in FIGS. 2a–c.

8. Note that each connector line between Test Functions in the same function is in red.

9. To obtain synchronization between Test Functions drag the cursor from the output of one Test Function to the title of a different function. In one embodiment, this process constitutes a means for defining synchronicity a between the Test Functions of different Communications Channels such that the execution of a Test Function of a second Communications Channel does not begin until completion of a Test Function on the first Communications Channel. As shown in FIG. 2a-c, the following synchronizations should be created:

| Output Channel | Function Block | Function Output | Connect to Input Channel | Connect to Function Block |
|---|---|---|---|---|
| 1 | Open | OK | 0 | Make Call |
| 1 | Setup Conference | OK | 2 | Receive Call |
| 1 | Add to Conference | OK | 0 | Sleep |
| 0 | Sleep | OK | 2 | End Call |
| 0 | Sleep | OK | 1 | Drop |

The synchronizations are represented by dashed, red lines. As a result of these synchronizations, each Test Function having a synchronized input will defer execution until the completion of Test Function with which it is synchronized, 10. Choose File|Save as from the Main Menu and save the current Test Scenario as 3 Party Conference Call. In one embodiment, all Test Scenario files are saved with a ".tst" file extension. It will be appreciated by those of skill in the art, that the Test Scenario file may be stored independently of (without references to) specific Communications Channels with which the Communications Channel may later be used. This is because in the described embodiment, the Test Scenario only refers to Relative Channels (in this case, 0, 1 and 2).

The Test Scenario will function as follows. The conference call is established on the TAPI channel (channel 1). From the IP(H323) channel (channel 0) a call is placed (H323MakeCall function); the TAPI channel responds to this call (Answer function). The conference is set up (Setup Conference function, channel 1). A new call is initiated from the TAPI channel to TDM channel (Dial function), then the Receive Call (on the TDM channel) answers this call. Next, on the TAPI channel, the new call is added to conference; the third party conference is established. The Sleep function (channel 0) simulates the conversation. Next, the calls are dropped and disconnected.

Those of skill in the art will appreciate that this scenario is designed to execute three different Interface Protocols simultaneously. Moreover, the execution of specific functions in different channels utilizing different Interface Protocols has been accomplished. The format for a test scenario is included in the computer program listing.

Running a Test Scenario

If post execution analysis of the results is needed, before running the currently selected Test Scenario, the user should make sure that the Save Results in Database option is checked in Tools|Global Settings. To check the results on the local host computer, make sure that the option Save results in local binary files in Tools|Global Settings is checked. The user then presses the Run button on the toolbar, which is shown in FIG. 2a. If the profile was not saved, the user will be prompted to save it. This causes the execution profile and Test Scenario(s) to be sent to the Agents selected in the execution profile. The Agents then execute those portions of the Test Scenario having channels they control, and store the results either locally or in the reporting database server as selected by the user.

Monitoring the Execution of the Test Scenario

After the Run button is pressed, the execution may be monitored using the Monitor and Execution Control window. This may be done by pressing the Monitor and Execution Control button on the Shortcuts Bar, the leftmost pane in FIG. 2a, and selecting one of the three tabs at the bottom of this pane, which are entitled "Channel Details," "Channel List" and "Statistics." When the "Channel Details" tab is selected as shown in FIG. 11, a view is provided showing: Agent Alias, Agent Channel number, Logical Channel status, current iteration/time left, the function that is currently executed on each channel, the result of the last executed function, the engine specific. When the "Channel List" tab is selected as shown in FIG. 12, a view is provided that shows all the channels in the current Execution Profile. The user may double-click any channel in the list, in order to switch back to the "Channel Details" tab, which will then be focused on the selected channel runtime parameters. When the "Statistics" tab is selected as shown in FIG. 13, a view is provided that shows the runtime values for the existing Statistic Counters and Timing Benches.

The Statistics page provides partial and total real time statistics that are extracted from the currently executed functions. For example, when running tests with GlobalCall functions, the following statistics (but not limited too) are displayed: Calls Initiated, Calls Completed, Calls Received, Calls Answered, Calls Ended, BHCC (the number of calls initiated and completed on the respective channel)

Figure 33:
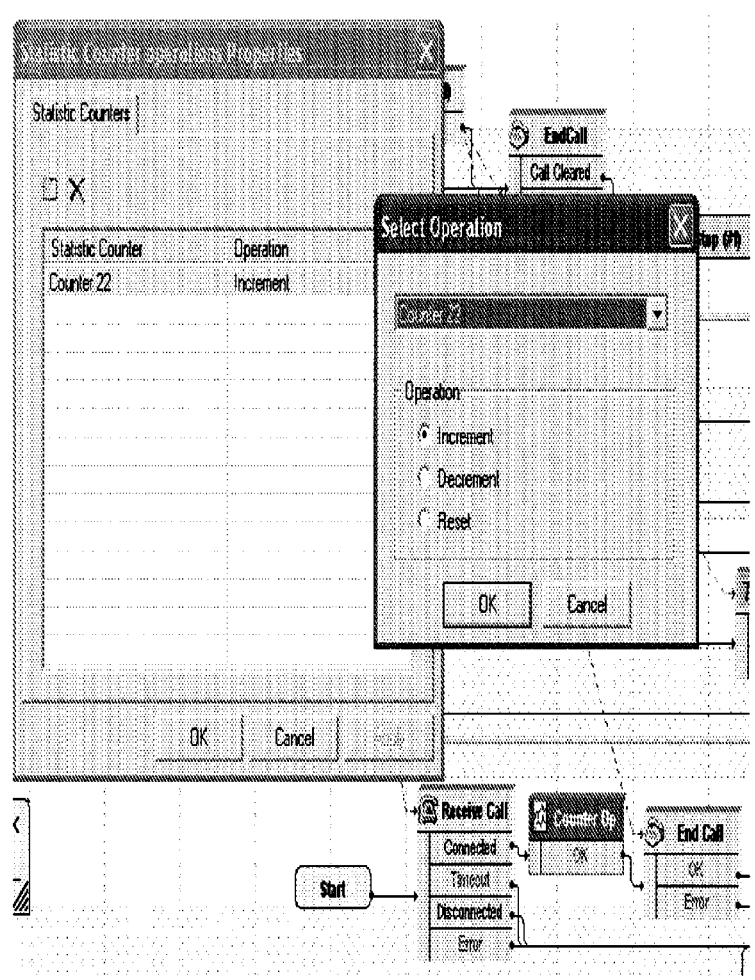
FIG. 33 is a view of a graphical user interface for a communications testing system showing a method of specifying User Specified Statistical Data, such as a counter, by inserting it into a test sequence.

To collect User Specified Statistical Data, such as a statistics counter or timing benchmarks to a Test Scenario, the user may Double-click on the function <CounterOp> in the Scenario Editor Workspace (FIG. 32), drag a counter icon into a test scenario workspace (FIG. 33), which will open a dialog box for defining a counter and indicating whether the counter should be incremented, decremented or reset when it is encountered during execution flow.

As shown in each of FIGS. 11–13, the Monitor and Execution Control screen includes a "Filter" button. If in the Execution Profile there is more than one Agent, but the execution is done only on the channels of one RTU Agent, depressing the Filter button allows the user to monitor only the Agent that is involved in the execution process.

While the execution is in progress, the Stop, Pause and Resume buttons as shown in FIGS. 11–13, allow controlling the execution flow on any channels that have been selected in either of the "Channel Details," "Channel List" or "Statistics" panes.

Viewing the Results

In the sample described above, the results of the execution are saved both on the Agent (localhost computer) and on the database server. The database server is used to save the results and perform an analysis on the set of results. To access the results saved on the localhost computer, depress the drop down button to the right of the View Results button (shown in the upper right portion of FIGS. 11–13) and select Local Results. As noted above, this requires that the "Save Results in local binary files" option in Tools|Global Settings is checked and that the Collect Scheme parameter for the channels supporting the execution is not set to <NONE> in the Edit Logical Channels window before running the test.

Figure 14:
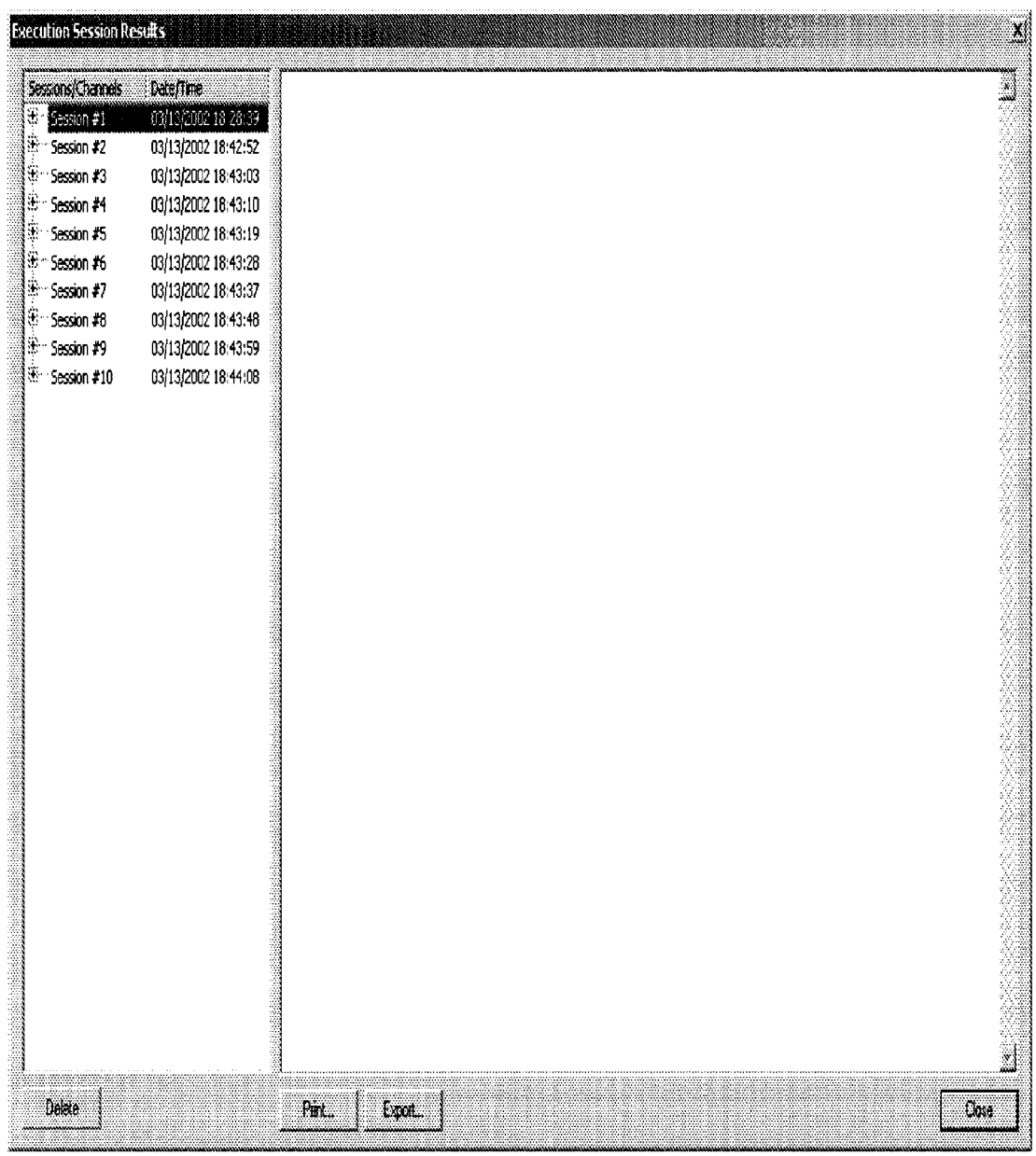
FIG. 14 is a view of a graphical user interface for a communications testing system showing an execution results window which allows in-depth access to the results of an execution session both regarding the execution flow on a whole channel for all the iterations set in the execution profile.
Figure 15:
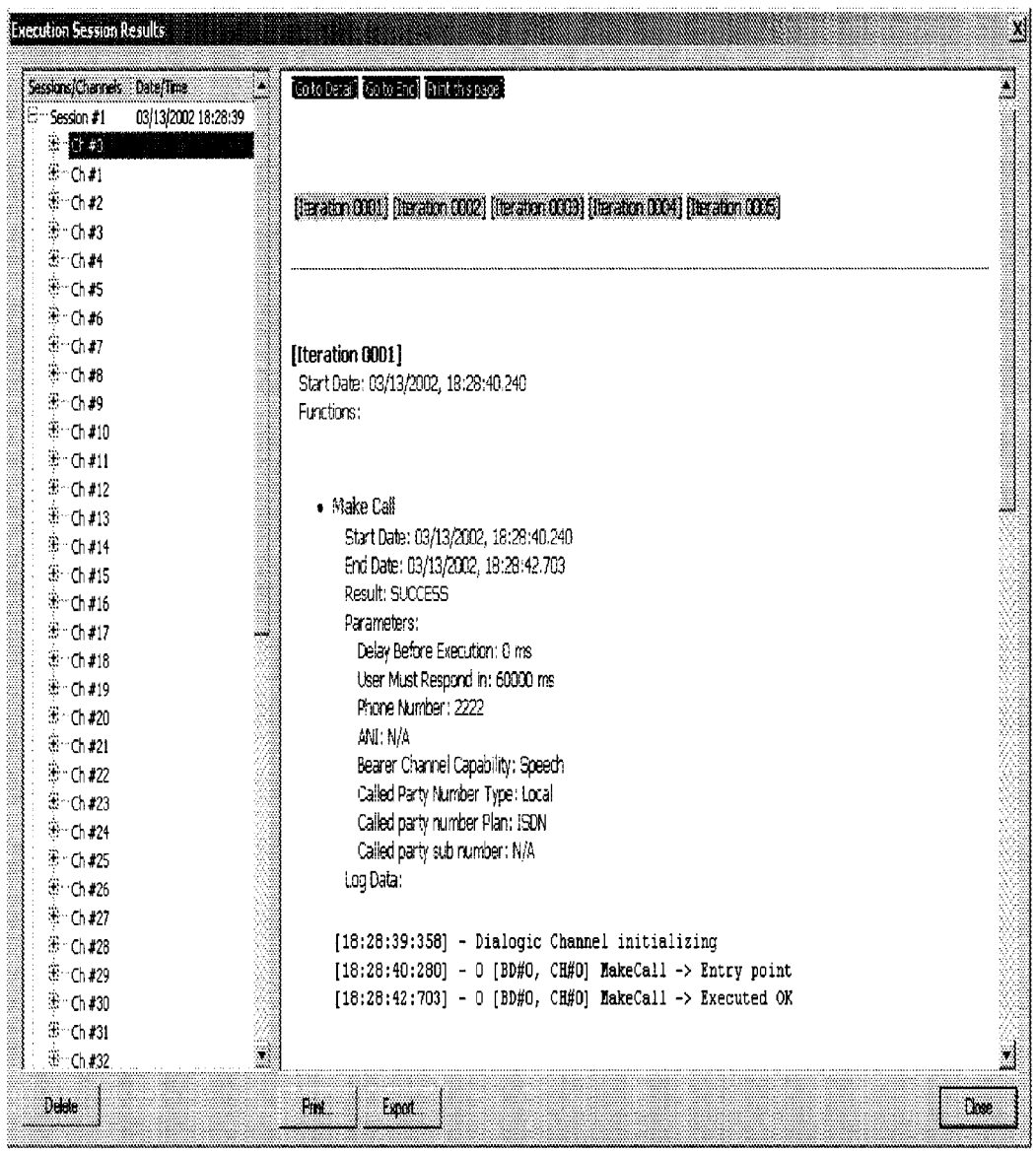
FIG. 15 is a view of a graphical user interface for a communications testing system showing an implementation of Layered Results Analysis, whereby channels, and iterations may be selected, as well as Log Data for the selected iteration.
Figure 16:
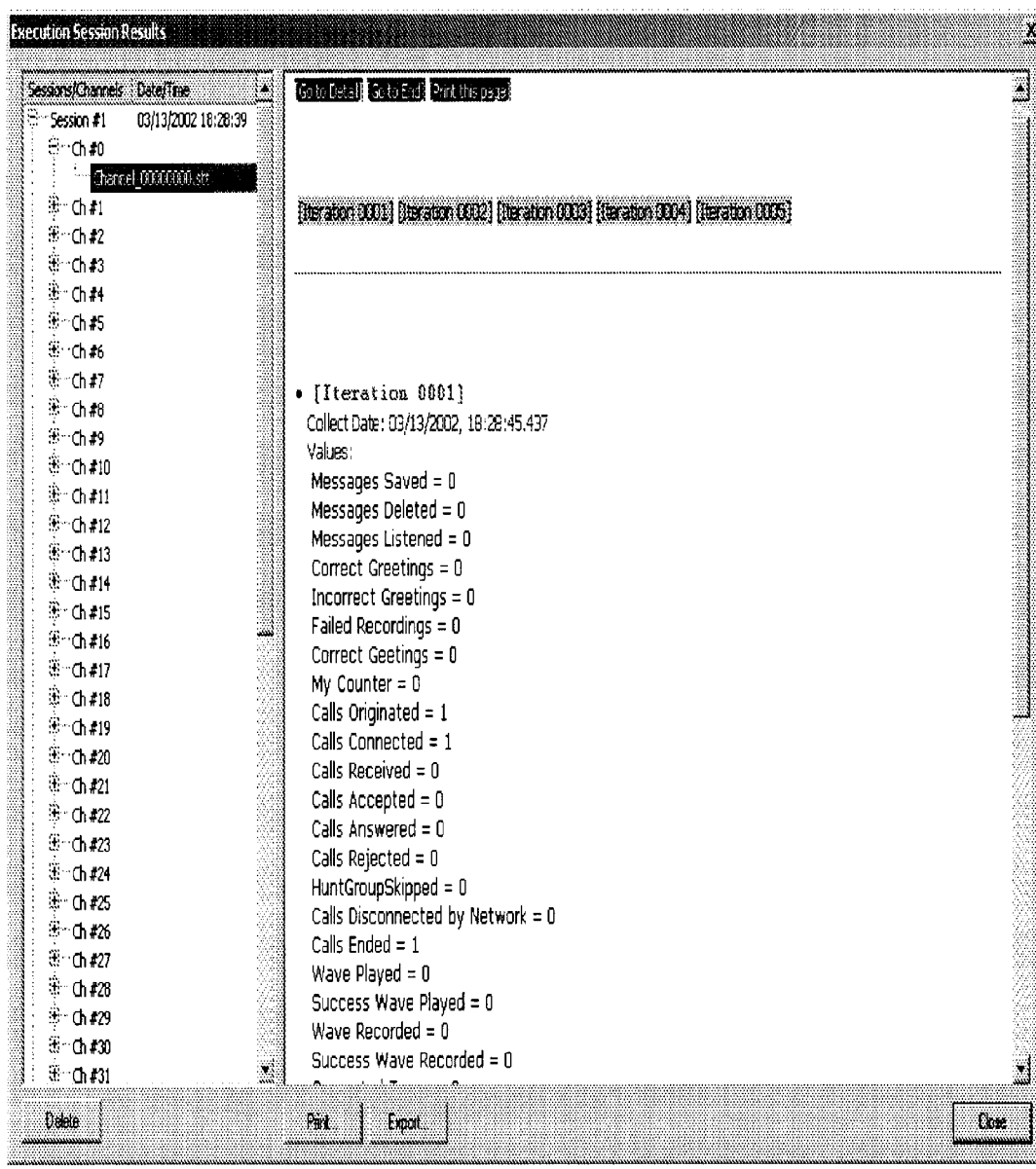
FIG. 16 is a view of a graphical user interface for a communications testing system showing a window for displaying Log Level Detail information.

An Execution Results window will be displayed as shown in FIG. 14. This window allows an in-depth access to the results of an execution session both regarding the execution flow on a whole channel for all the iterations set in the execution profile. It will be appreciated that on a local machine, different Test Scenario sessions may be run at different times, and for each Test Scenario session, multiple channels on the local machine may have been used. Accordingly in this view, the sessions and channels are organized hierarchically. By expanding a session (by clicking the "+" to the right of its name), the list of channels for the Agent is expanded as shown in (FIGS. 15 and 16). Referring first to FIG. 15, a list of all Channels used in the Test Scenario is displayed in the left pane. These channels correlate to the Communications Channels controllable by the particular Agent. As discussed above, these may not match the "Logical Channels" previously used to define a scenario to be implemented by multiple Agents. For example, if there are two Agents, each with 24 channels that will be used in a Test Scenario, the 24 channels of the first Agent may have been mapped to Logical Channels 0–23, and the 24 channels of the second Agent may have been mapped to Logical Channels 24–47. However, when the "local results" of either of these Agents is viewed, each will report channel 0–23.

Any Logical Channel may be highlighted, and for the highlighted channel, the right pane displays at the top a list of each iteration of the Test Scenario for that channel. In addition, this top portion displays hyperlinks to each iteration, and by clicking an iteration number, the lower part of the right pane will jump to the selected iteration number. In the bottom of the right pane, there is displayed a list of each iteration of the Test Sequence for the channel. For each iteration, the starting date and time is shown, followed by a breakdown of details for each Test Sequence for the iteration. For example, as shown in FIG. 15, there were 5 iterations performed, and the first Test Function for each iteration was the Make Call function. The starting times, results, parameters and Log Data for this Test Function of this iteration are all shown. By scrolling downward in this window, the user may view the remaining Test Function information in the first iteration, and then the second through fifth iterations.

Figure 17:
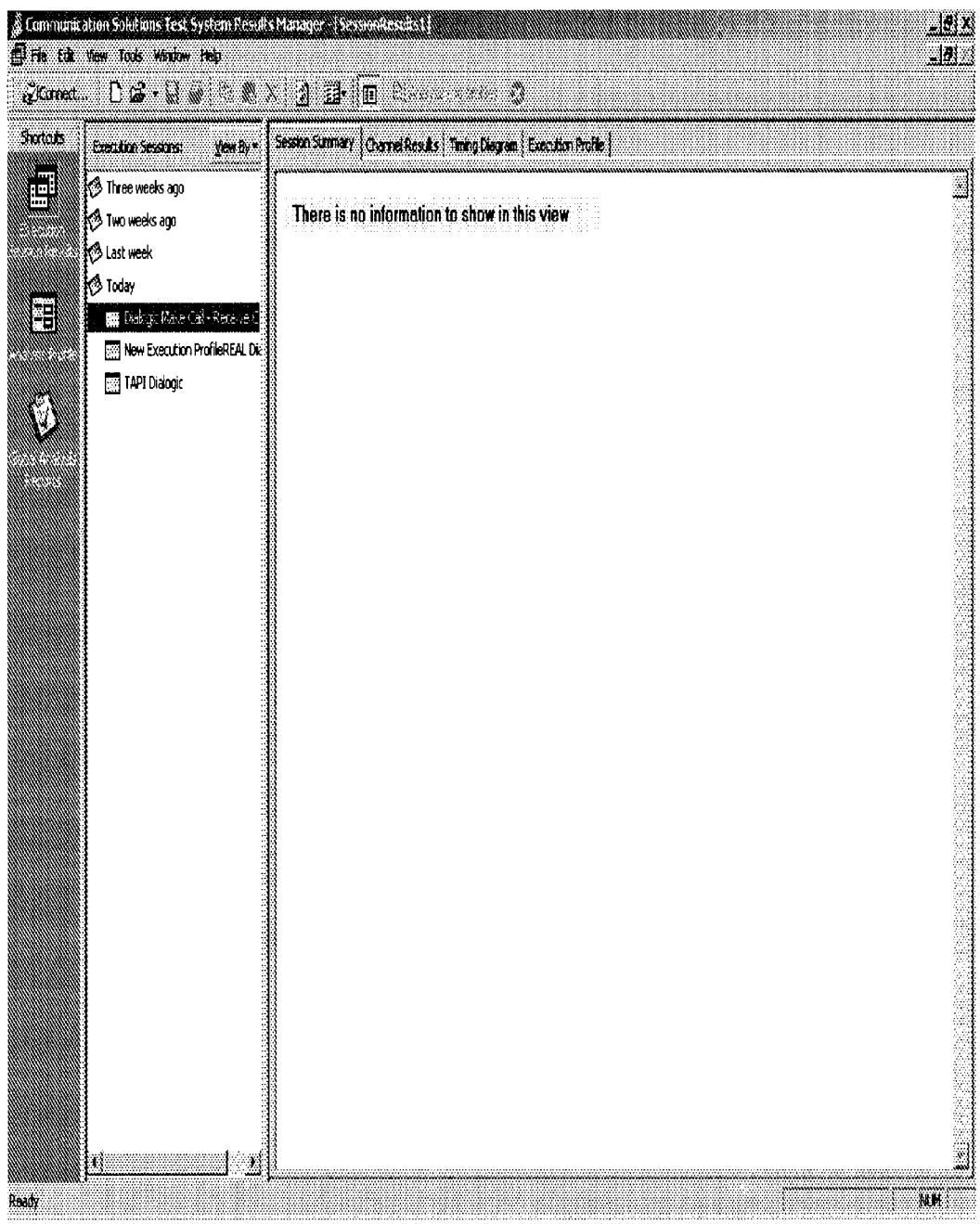
FIG. 17 is a view of a graphical user interface for a communications testing system showing an initial screen for the results manager module when it is invoked form the execution manager module.

In addition, as shown if FIG. 16, for each iteration/Test Function combination, various data may be collected. The universe of data that may be collected will have been specified the Agent software, but the Agent will only collect the data specified by the Log Detail Level (e.g., none, quiet, verbose or debug) By pressing the "+" to the left of the channel number in the left pane, the channel for that session is shown. Depending on the setting the following information may be displayed: 1. None, 2. Errors Only, 3. Normal—between Errors and Debug, without the decoding of all the errors, 4. Debug—full, time stamp on events and functions, and decoding of all the functions parameters In order to access the results saved on the remote database server, click on the drop down list indicator (immediately to the right of the View Results button on FIGS. 11–13) and select Database results. Choose the remote database server where the results were saved. In one embodiment of the system, each Agent (localhost computer) must have installed on it a Microsoft SQL database client to facilitate its reporting of test results to the database server. This will invoke the results manager portion of the Testing Systems software, and establish a connection with the reporting Database Server, resulting in the display of the screen shown in FIG. 17.

Figure 18:
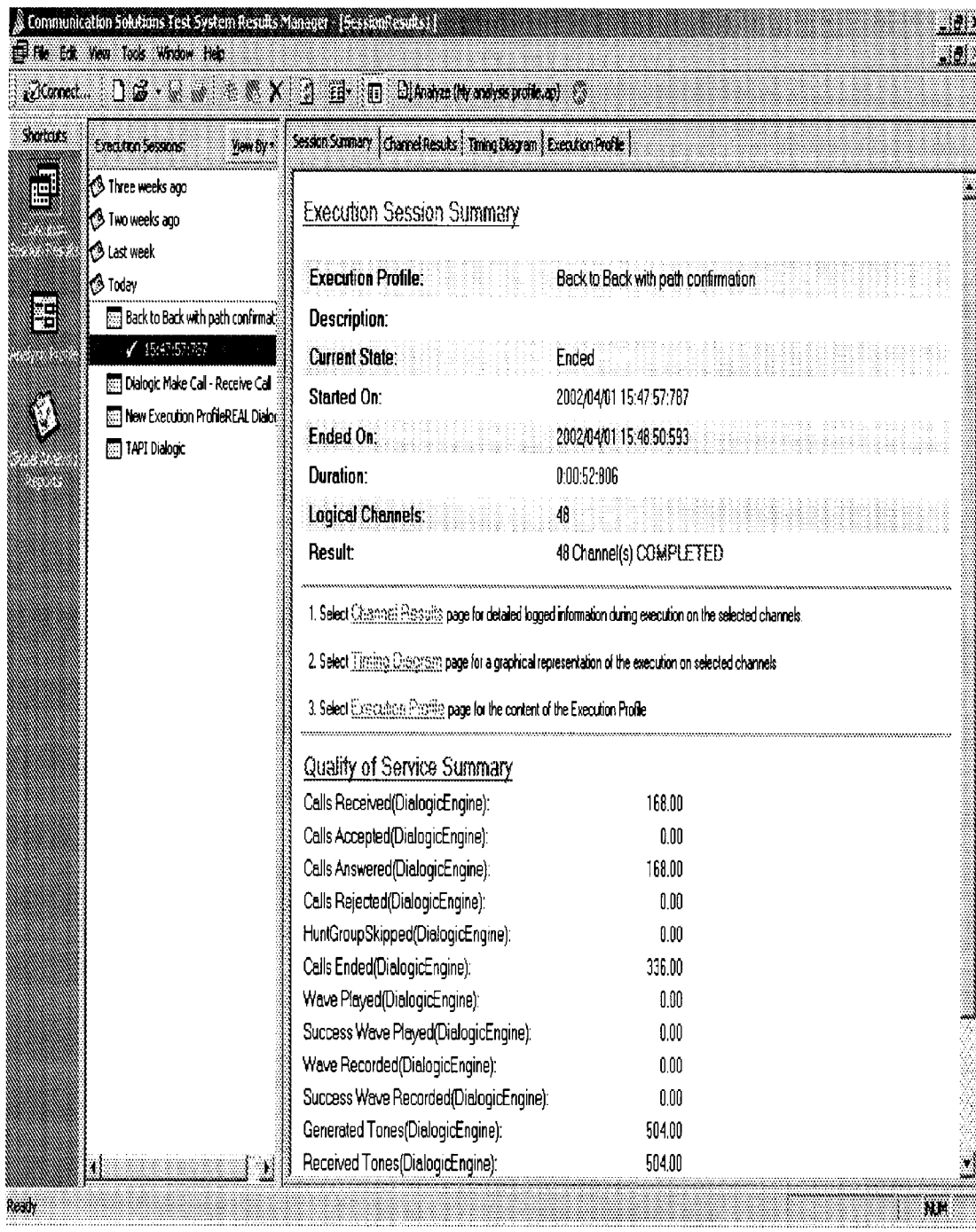
FIG. 18 is a view of a graphical user interface for a communications testing system showing a window for displaying information available for an execution session.

The pane entitled Execution Sessions shows all executions sessions for which the Agents have reported results to the database server, initially sorted by date. By Selecting the View button in this pane, the user may sort the sessions by either date/time or by the analysis profile. To access information available for an execution session, the user highlights the date and time of the execution session, which results in information being displayed in the right-most pane, as shown in FIG. 18. This pane allows information to be displayed in one of four formats by selecting the applicable tabs, as follows:

The Execution Summary pane displays an overview of the execution session.

Figure 19:
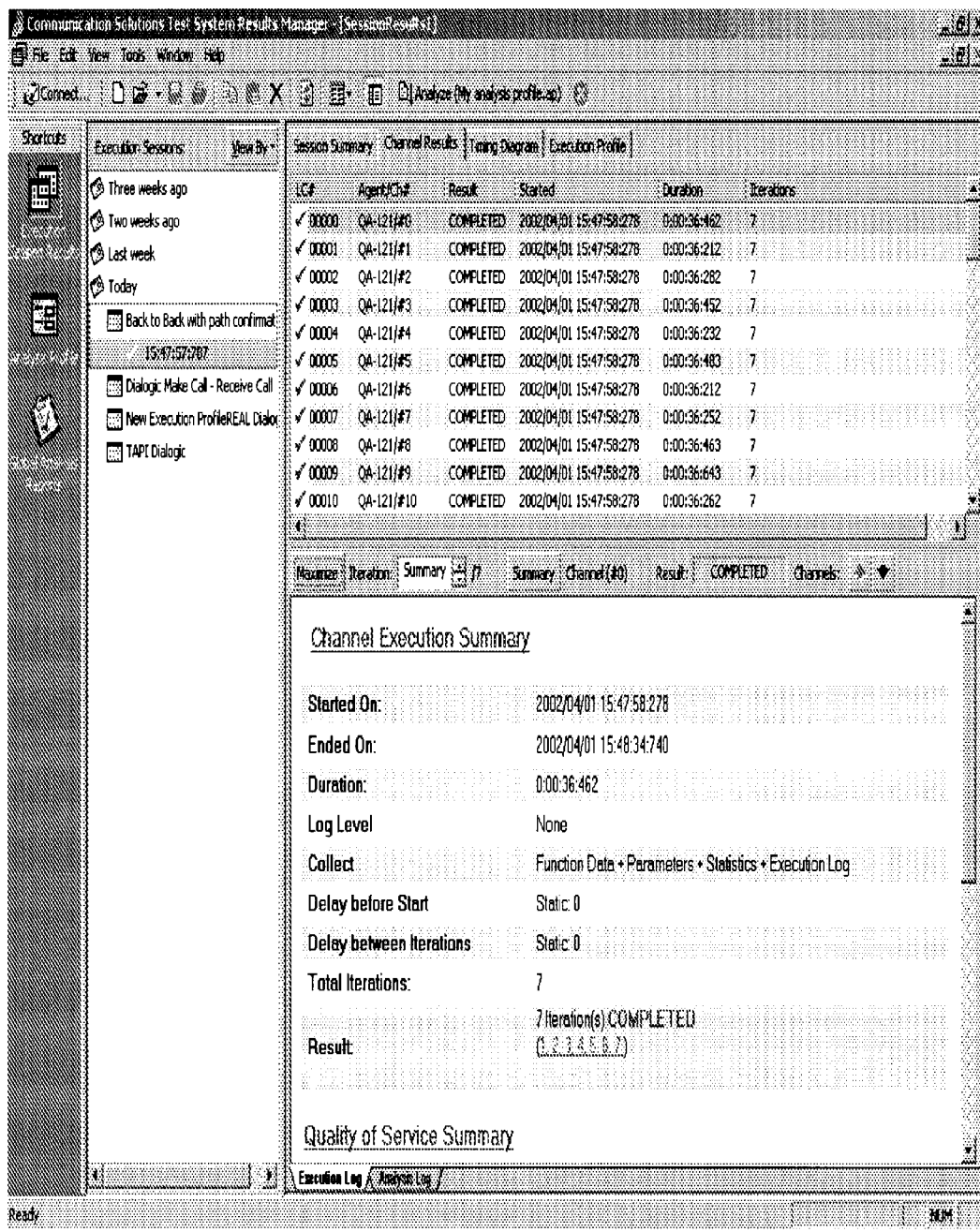
FIG. 19 is a view of a graphical user interface for a communications testing system showing a window for providing information on both the execution flow on the channels that supported the execution session, and on the execution summary for each channel and iteration.

The Channel Results pane (FIG. 19) provides information on the execution flow on each channel and the result of the execution on each channel. In particular, this pane shows both the execution flow on the channels that supported the execution session, in the upper window while the lower window provides information on the execution summary for each channel and iteration.

Figure 20:
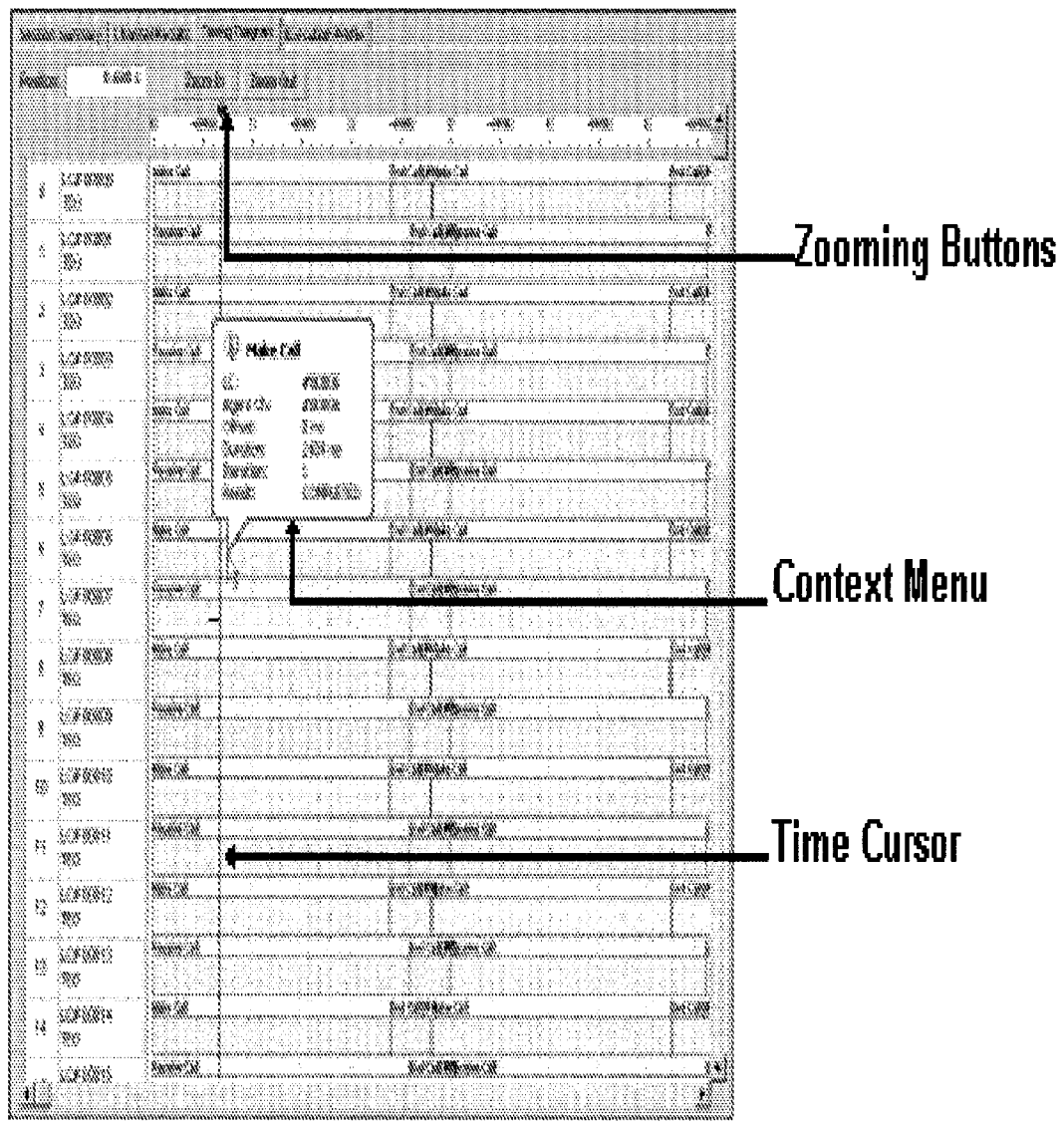
FIG. 20 is a view of a graphical user interface for a communications testing system showing a window for displaying a Call Race view (time slice viewer) of the execution flow for all of the channels, as well as a context menu.

The Timing Diagram pane (FIG. 20) gives a Call Race view (time slice viewer) of the execution flow for all of the channels. Specifically, this aspect of the invention provides a means for displaying the results of the execution of the Test Scenarios, such that the results from each Test Scenario share a common time baseline. Moreover, the results are displayed in an area having first and second axes, wherein in horizontal axis represents time, and the second axis displays a bar for each Communications Channel, with each bar having markers corresponding to the time spent performing each Test Function applied to the Communications Channel. The functions performed on each channel are divided into adjacently positioned blocks, showing the time each function begin and end on each channel. By clicking on any portion of the screen showing the duration of time blocks, the Time Cursor will move to the location selected, and the time represented by the cursor will be shown in the position box in the upper left hand corner of the pane. Moving the cursor over any time block representing a function of a channel and holding the cursor at that location for over one second will result in the display of a pop-up context menu, showing information about the precise time/channel combination, including the Logical Channel, Agent channel, the time the Test Function began, the duration of the Test Function (width of the time block), the iteration number and the result of the Test Function. In addition, the Zoom In and Zoom Out buttons will enlarge and shrink the view of the channels and Test Function blocks so that various levels of detail may be examined.

Figure 21:
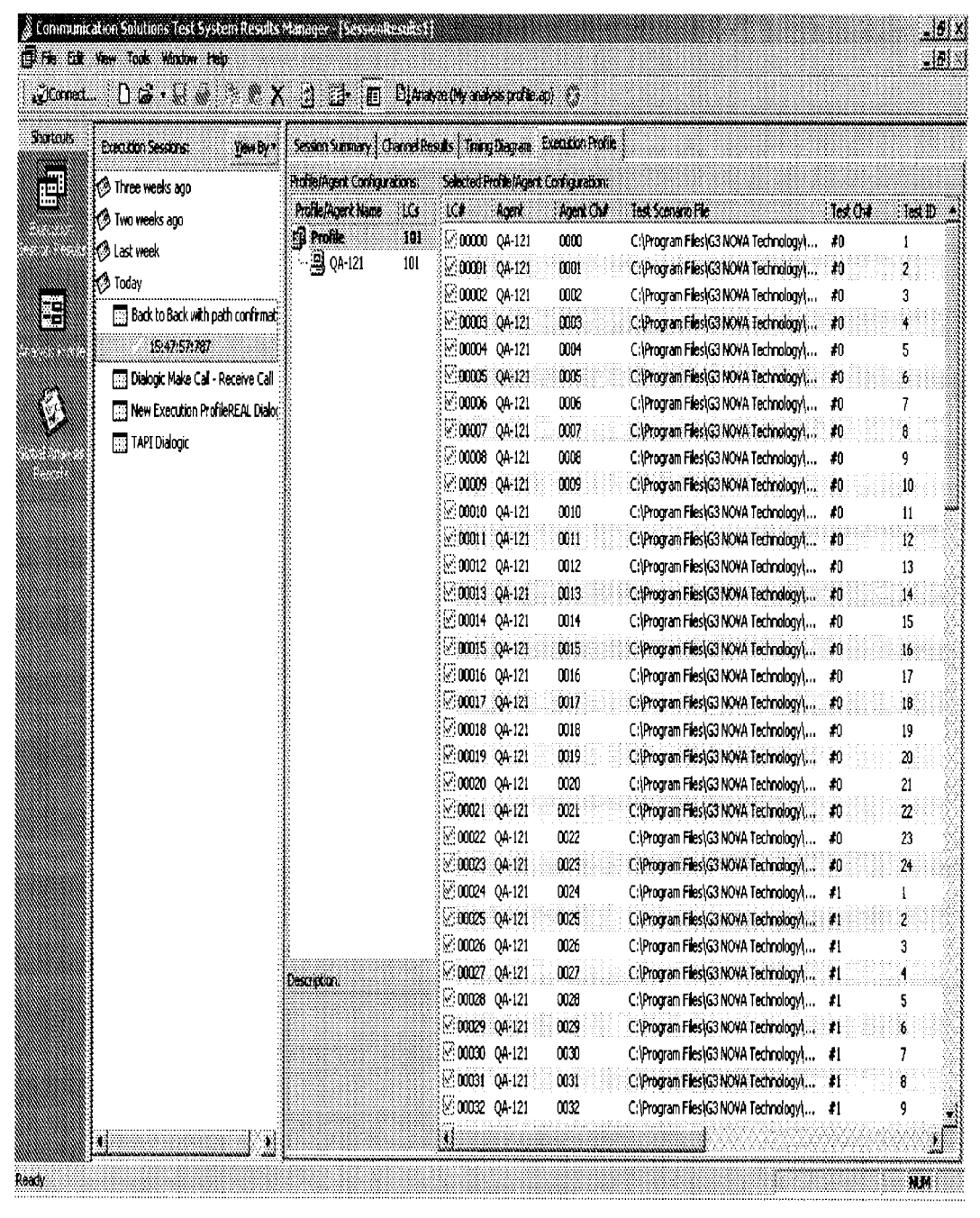

The Execution Profile pane (FIG. 21) displays the profile of the execution session, which is the same type of pane shown in FIG. 3.

The above information provides raw information regarding the Test Scenario, the execution profile and the data collected. However, in one embodiment of the invention, additional features are provided to allow more detailed analysis of the data.

Analyzing the Results

One step that may be taken to analyze results is to create an analysis profile, which may be done by invoking the Analysis Profile screen (by pressing the Analysis Profile shortcut in the left pane (FIG. 22), then pressing the New button under Analysis Profile on the toolbar to create a new analysis profile. (Alternatively, a previously saved Analysis Profile may be retrieved by Clicking File|Open, and, if desired, saved using a different file name. The Analysis Profile allows definition of the criteria for the post processing of the results, such as defining pass/fail criteria, It also applies the pass/fail criteria to the recorded Log Data to generate pass/tail information and displays the pass/fail information.

To define Passed, Warning or Failed conditions for all counters and timing benches recorded during the execution, double click the name of a counter or select it and press the Edit button. The window that will appear will allow describing the result criteria for the current analysis profile. In one embodiment, certain times and counters will be automatically included in each test scenario, such as total time to complete the scenario and the number of originate calls. In addition, any counters or timers defined by the user to collect User Defined Statistical Data will be displayed here.

The Analysis Profile section contains two tabs, Timing Benches and Statistics Counters. The Timing Benches report the time duration metrics for the execution of Test Functions, Sequences and Scenarios, while the Statistics Counters report totals numbers for the completion of various events. For example, for a Make Call—Receive Call Test Scenario, described above (and in FIG. 2), one of the Test Functions for Channel 0 is to "Play Prompt," which may mean, for example, to play a recorded message stating "No one is available, please leave your message after the tone." The user's objective may be to ensure that the playing of this message is always completed within 5 seconds after the call is received. To test for this, the user could go to the Analysis Profile screen shown in FIG. 23, and click on the row labeled "Time to Response." Using the drop down menu, the user then specifies a "<" for the Criteria, and 2 for the value and enters Report as "PASSED" and "FAILED" for Otherwise, then clicks OK. Thus, when the analysis is applied to the results, for each of the 500 iterations, those calls for which the response time was under 2 milliseconds will be considered successes, the calls that did not meet these criteria will be considered failures. All timing numbers are specified in milliseconds. Of course, any criteria may be specified for any timing bench. In addition, the user may click on the Global Analysis Report Tab, as shown in FIG. 24. The drop down box in this dialog may be set to either Sum( ) or Average( ). The indicated function will be applied to the selected Timing Bench or Statistics Counter, which will thereafter be displayed in the Global Analysis column and used in the formula specified in the Iteration/Channel Analysis tab. In addition, Statistics Counters may be specified by clicking on the Statistics Counters tab, which is shown in FIGS. 2 and 24.

For both and Timing Benches and Statistics Counters, the user may check or uncheck the box at the left of the row to indicate whether the particular metric should be included in a Global Analysis Report.

Figure 22:
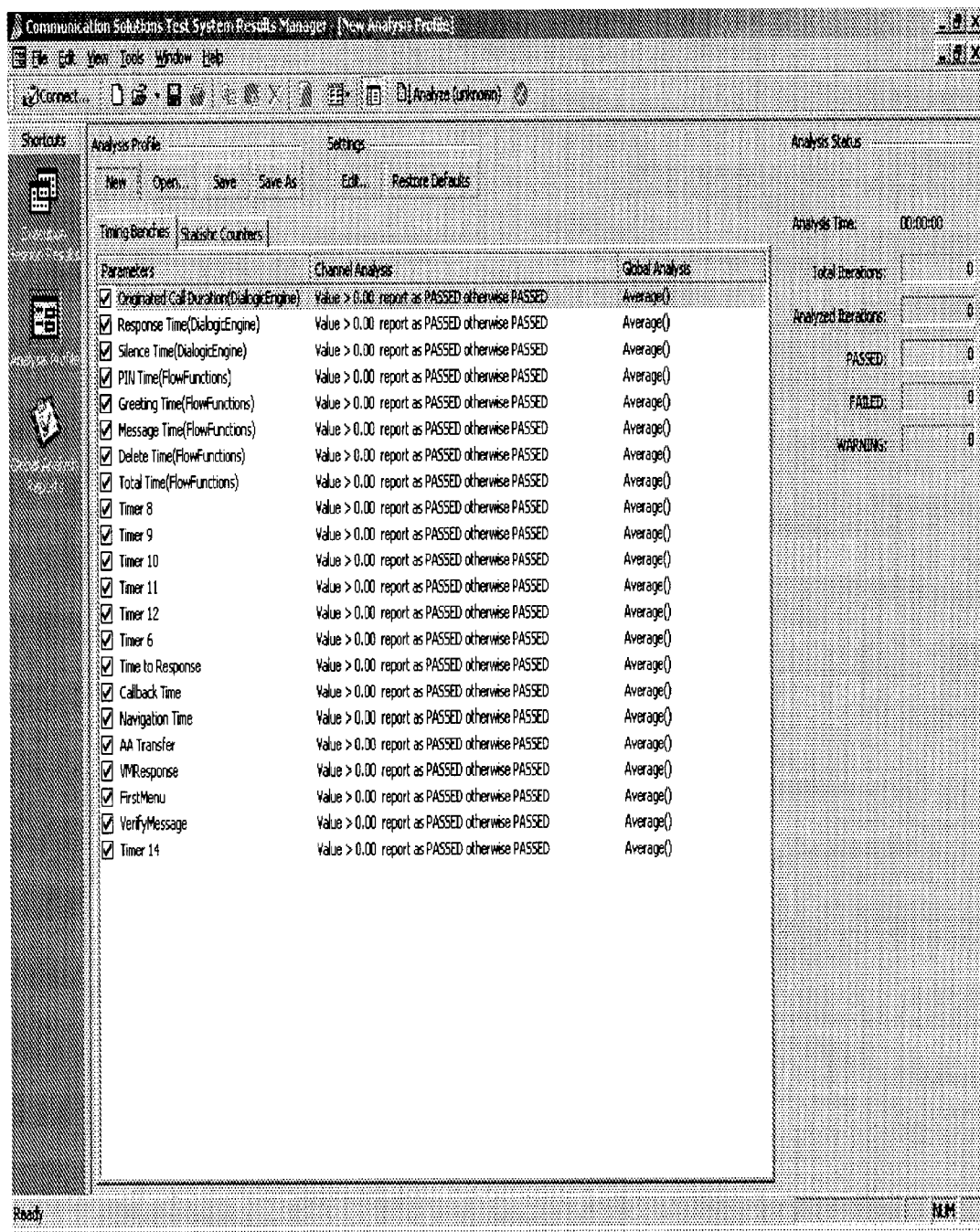
FIG. 22 is a view of a graphical user interface for a communications testing system showing a window for creating or editing an analysis profile.
Figure 25:
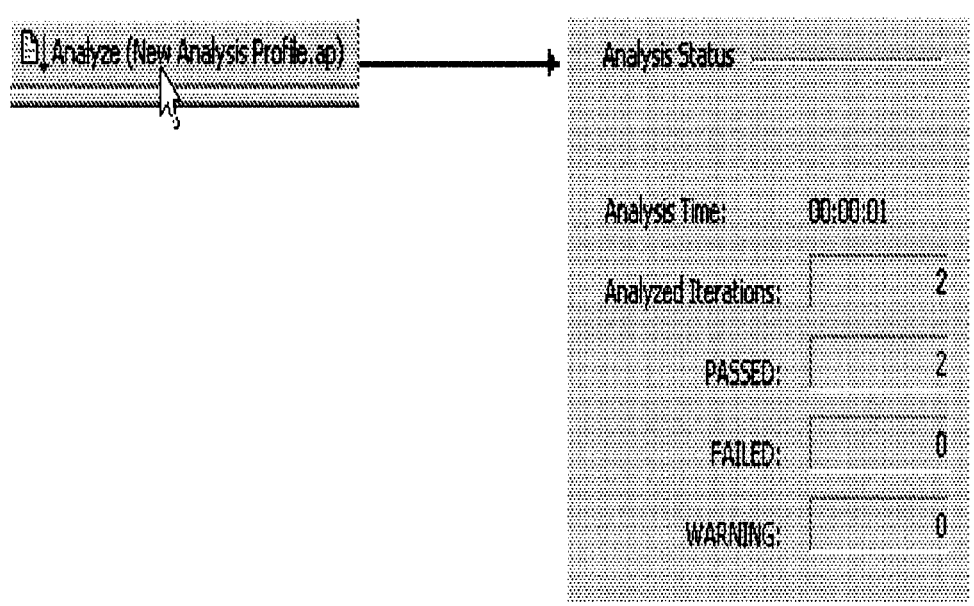
FIG. 25 is a view of a graphical user interface for a communications testing system showing a window for information reporting the analysis of Log Data in accordance with an Analysis Profile.
Figure 26:
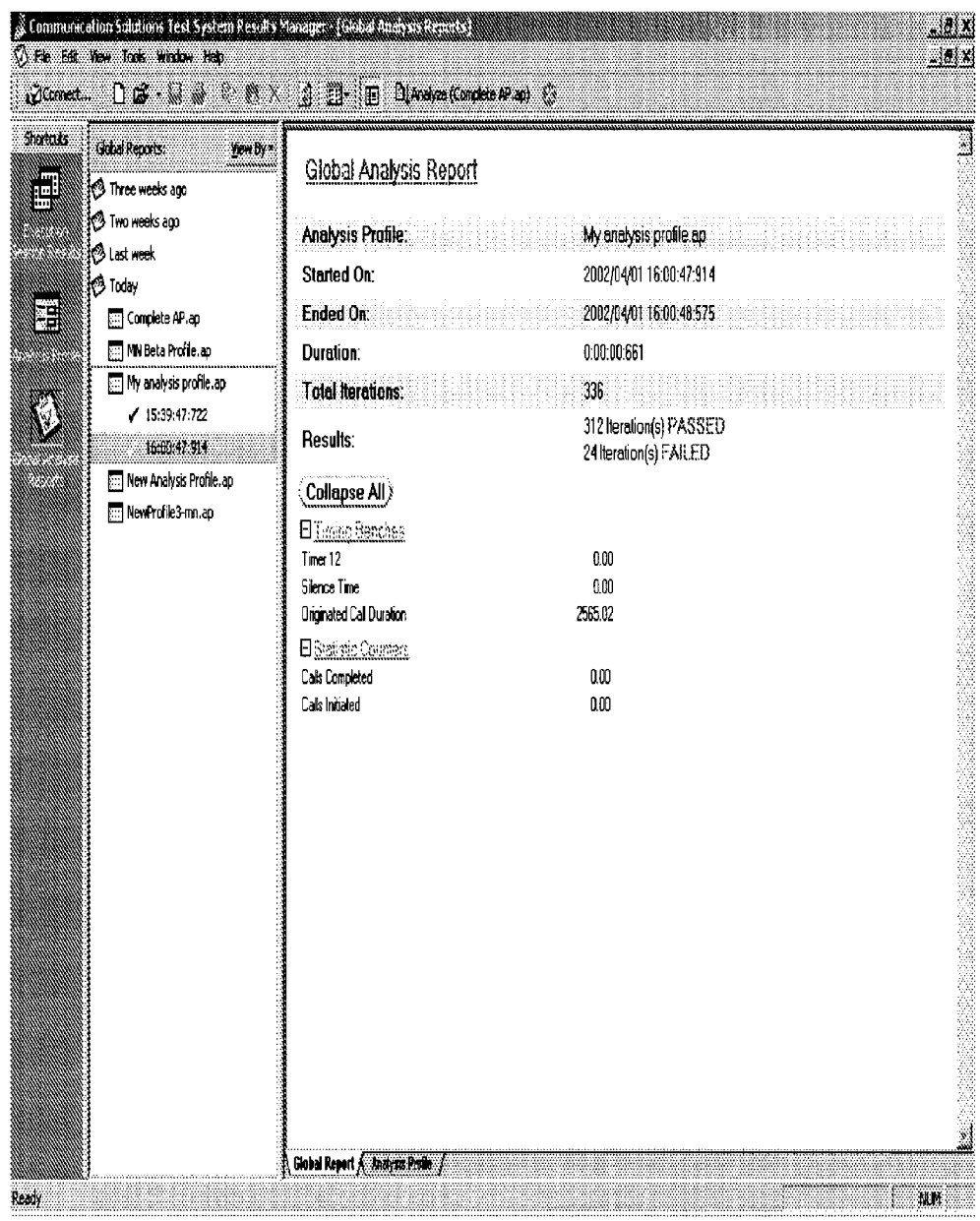
FIG. 26 is a view of a graphical user interface for a communications testing system showing a window for a Global Analysis Report showing the results of the application of a representative Analysis Profile, including the number of PASSSED results and FAILED results, as well as hyperlinks for Timing Benches and Statistics Counters.
Figure 27:
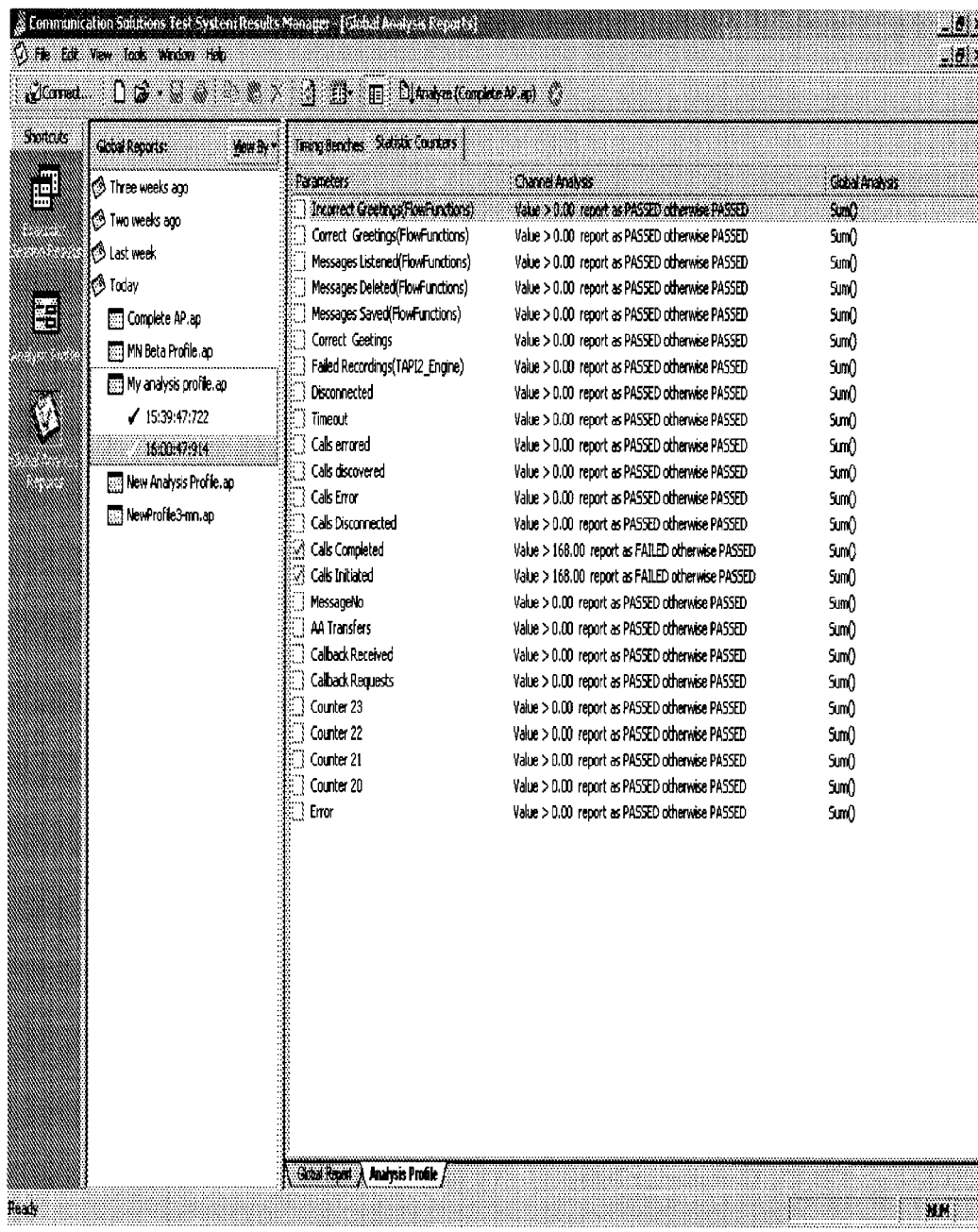
FIG. 27 is a view of a graphical user interface for a communications testing system showing a window in which the Analysis Profile tab is selected for a highlighted global report.

Once the Analysis profile is defined, the user may press Save button (FIG. 22). This allows the profile to be saved, so it may be later retrieved and analyzed. Next, the user may press Analyze on the main toolbar, to process the results of the execution session. As shown in FIG. 25, this results in display of the Analysis Status pane, which shows the number of Passed, Failed and Warning events processed according to the defined criteria. When the analysis is complete, the Global Analysis Reports screen is displayed as shown in FIG. 26. This comprises a left hand pane containing a listing of all generated Global Analysis Reports, and a right hand pane showing the specific report highlighted in the left hand pane. The Global Analysis Report shows the results of the application of the specific analysis profile shown above. Specifically, the number of iterations is shown, including the number resulting in PASSSED results and the number resulting in FAILED results. Moreover, the hyperlinks are shown for the Timing Benches and Statistics Counters. When either of these links are clicked, the will expand to show the details.

To help remind the user of the analysis profile used to create the Global Analysis Report, tabs are provided at the bottom of screen for Global Analysis and Analysis Profile. The user may click on the Analysis Profile tab, and this will display a pane have two subsidiary tabs, one for Timing Benches and one for Statistics Counters. This allows the user to confirm the metrics and pass—fail criteria used to conduct the Global Analysis. The appearance of these panes is similar to those shown in FIGS. 23 and 24, except, of course, the user is not allowed to change the metrics or pass—fail criteria, because the analysis has already been completed.

Methodologies

Those skilled in the art will appreciate that the present invention performs some of the functions of prior art communications platform testing systems, for example, creating scenarios, executing those scenarios and collecting and displaying results of tests. Accordingly details of how these functions are accomplished will not be discussed in detail, as they are known in the art. However, the following sets forth some of the methods and features that contribute to the inventive aspects of the present testing system.

Interface Protocol Libraries

One feature of the present invention is the use of Interface Protocol libraries. In one embodiment, separate computers are used to run the execution manager module and Agents. In this embodiment, each computers runs under the Windows operating system.

Detection of Agents by the Execution Manager

As noted above, one aspect of the invention is the detection of Agent computers on the network that can control Communications Channels of the communications platform under test, either through equipment or TAPI software. In one embodiment, to be "Discovered" a computer will either have Netbios enabled, or else the computer's name may be manually added into the poll.

For an Agent computer to be "discovered" by the Execution Manger, it must have Agent software installed. The Agent software components depend on Interface Protocols used by the device to be controlled by the Agent.

At the execution time, the Execution Manager starts an instance of the Agent. One Agent can be located on same computer with Execution Manager or, Agents may be on different computers that are connected to same network as the Execution Manager computer.

The Execution Manager will communicate to the Agent all information related with the part of the Test Scenario that will be executed by this Agent. The Agent controls the execution on the designed channels located on it, collects the execution results data and sends them to the Test System database (SQL Server). After the execution end the Agent instance is discharged.

Of course, the real process is more complex. The Execution Manager has the ability to control the Agent and the Agent communicates execution info to Execution Manager.

Building Test Scenarios for Many Channels

One aspect of the present invention addresses the problems of creating Test Scenarios for high bandwidth communications platform that have many channels. There are several problems presented by these platforms. First, most systems require that test sequences be written channel by channel. While it may be an elementary task to write a test sequence for a few channels, it can be very tedious to repeat this task for hundreds or thousands of channels. This task is complicated by the situation where different channels may use different Interface Protocols.

The present invention addresses these problems in several ways that allow Test Scenarios to be easily applied to multiple channels. A first concept in this process is the use of Relative Channels within a Test Scenario file. Relative channels mean that the channel upon which a test sequence is designed to operate is not dependent upon a specific communications resource. For example, in the Test Scenario building example given above, the scenario works with three channels. Instead of referring to specific communications resources, (such as the first TDM port on computer 1, internet telephone have at port 42,001 on IP number 192.168.22.6, and the tenth channel accessible by the TAPI Interface Protocol on the TEO computer) the Test Scenario simply refers to channels 0, 1 and 2. These are Relative Channels because they can be associated with different Logical Channels. This association is accomplished via the execution profile. Specifically, the execution profile uses "Logical Channels," each of which is associated with a physical channel in a test environment. (The term Logical Channels is used, because referring to a physical channel sequence can be ambiguous when multiple pieces of test equipment are used. For example, if two bulk call generators each have 0–255 channels, it would be ambiguous to refer to the tenth channel. Instead the system will assign the channels of the first bulk call generator to Logical Channels 0–255, and the channels of the second bulk call generator to Logical Channels 256–511.) The execution profile theoretically allows any Relative Channel of a Test Scenario (i.e., channel 0, 1 or 2) to be associated with any Logical Channel, and hence, with any physical channel. Moreover, Logical Channels of a Test Scenario can be associated with multiple Logical Channels, and hence, multiple physical channels. Those of skill in the art will appreciate that the divorcing of Test Scenario channels from physical channels provides great flexibility in building large Test Scenarios.

For example, the Test Scenario described above and shown in FIGS. 2a–2d, uses three channels, designated 0–2. However, to stress test a high bandwidth communications platform, the same Test Scenario can be applied multiple times to groups of channels as follows.

Figure 28:
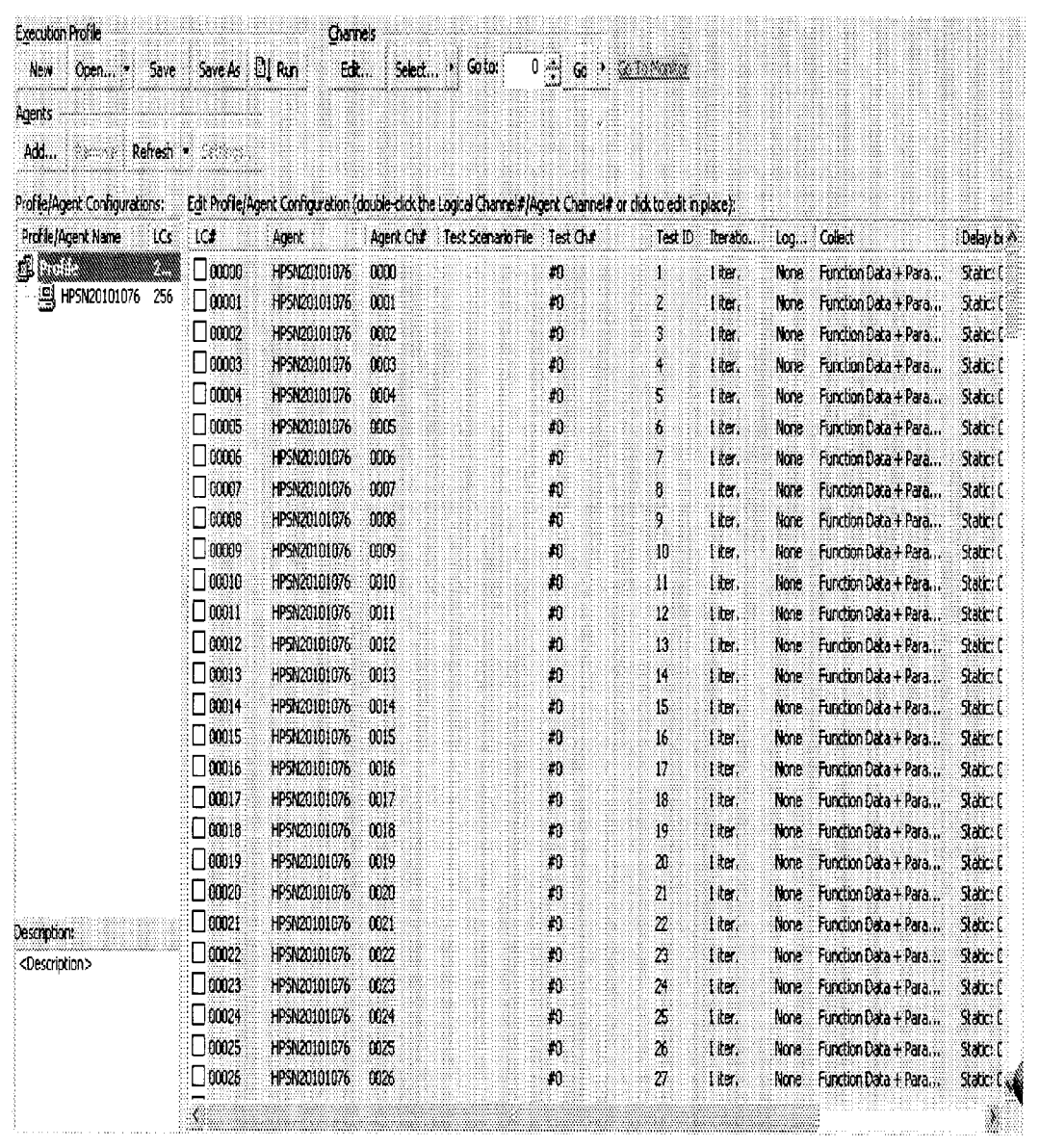
Figure 29:
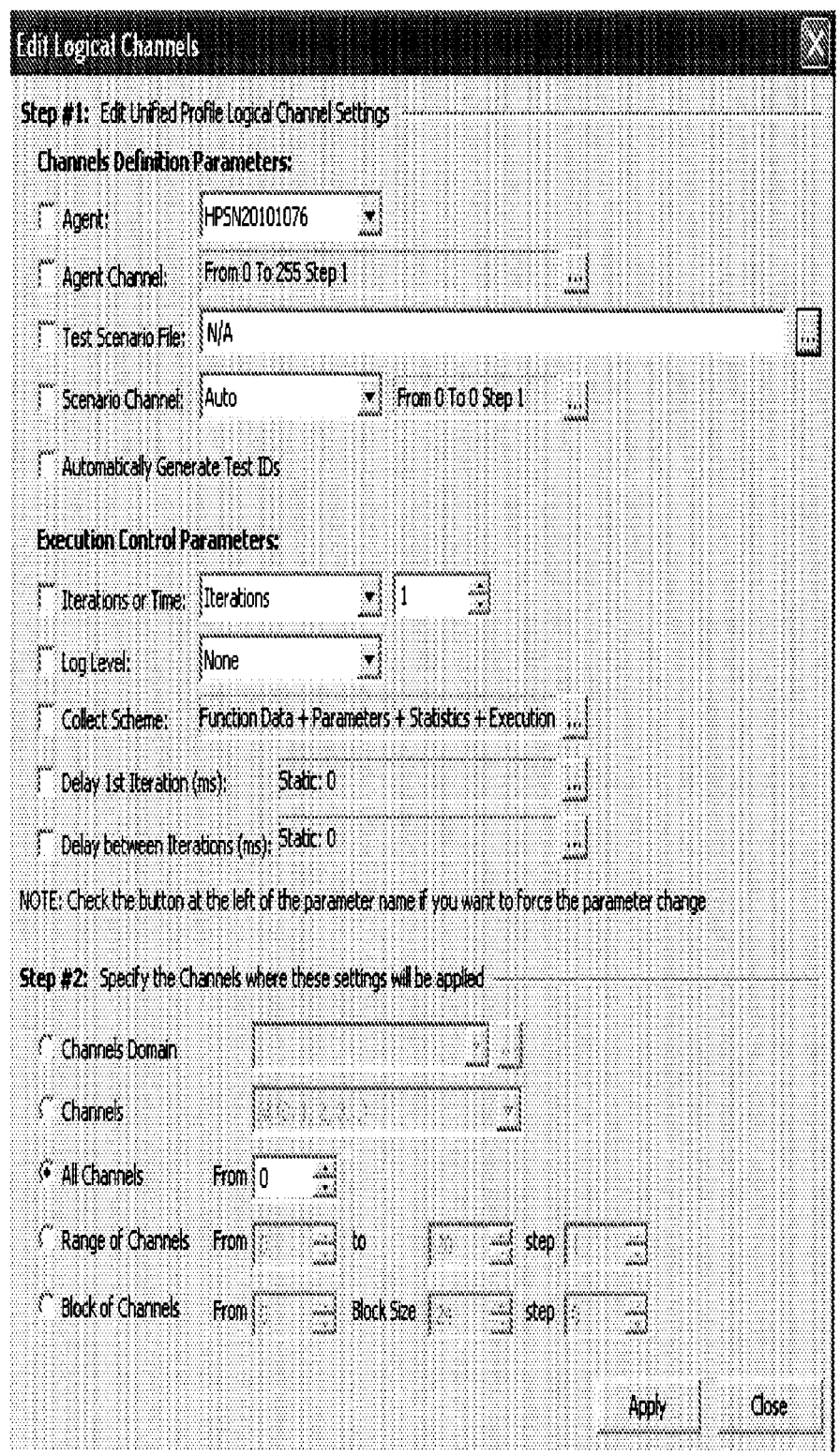
FIG. 29 is a view of a graphical user interface for a communications testing system showing a window for selecting groups of logical channels so that parameters maybe set for the selected group of channels.
Figure 30:
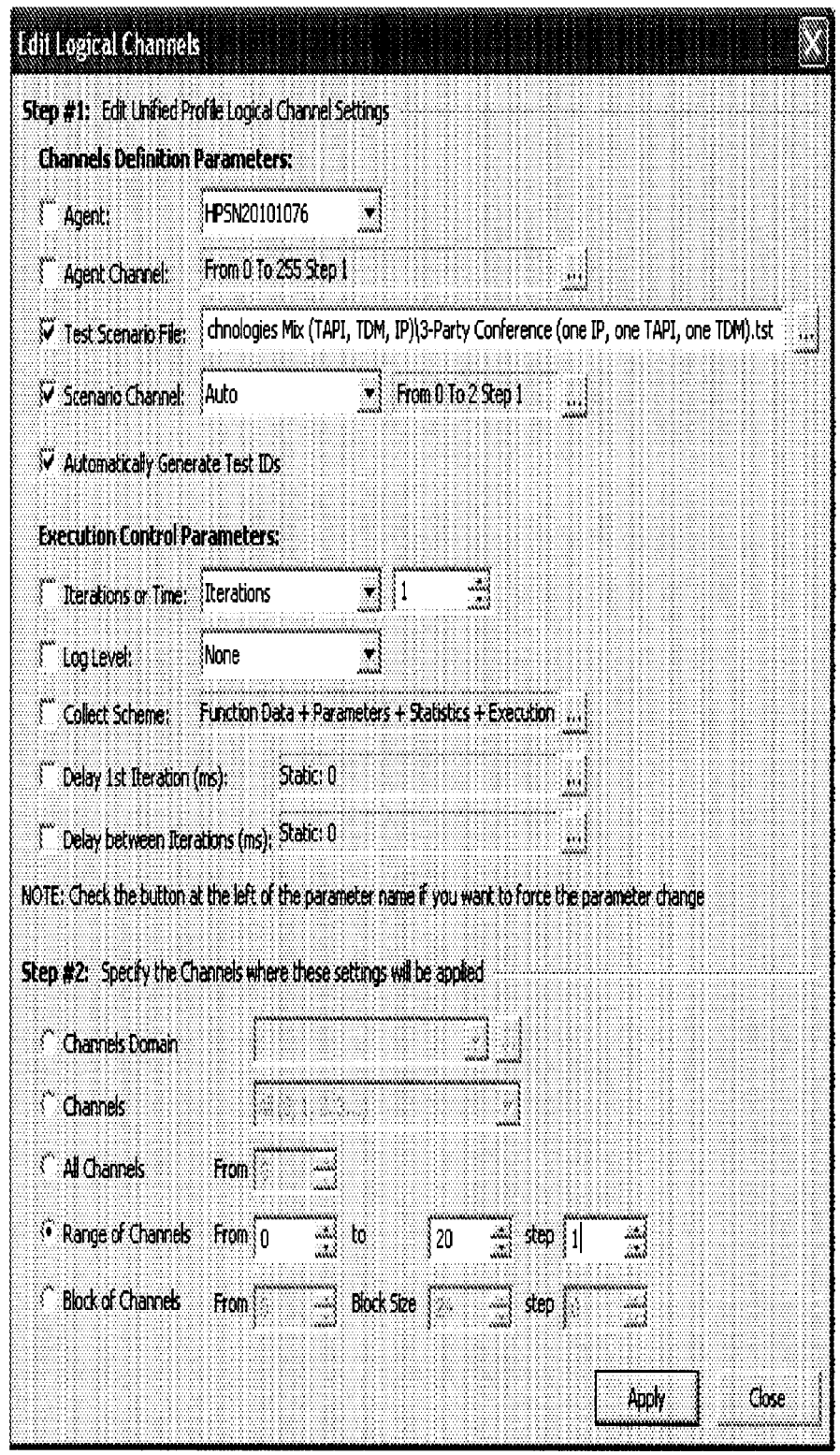
FIG. 30 is the Edit Channels screen of FIG. 29 with information specified for specifying a test scenario file and a group of channels.
Figure 31:
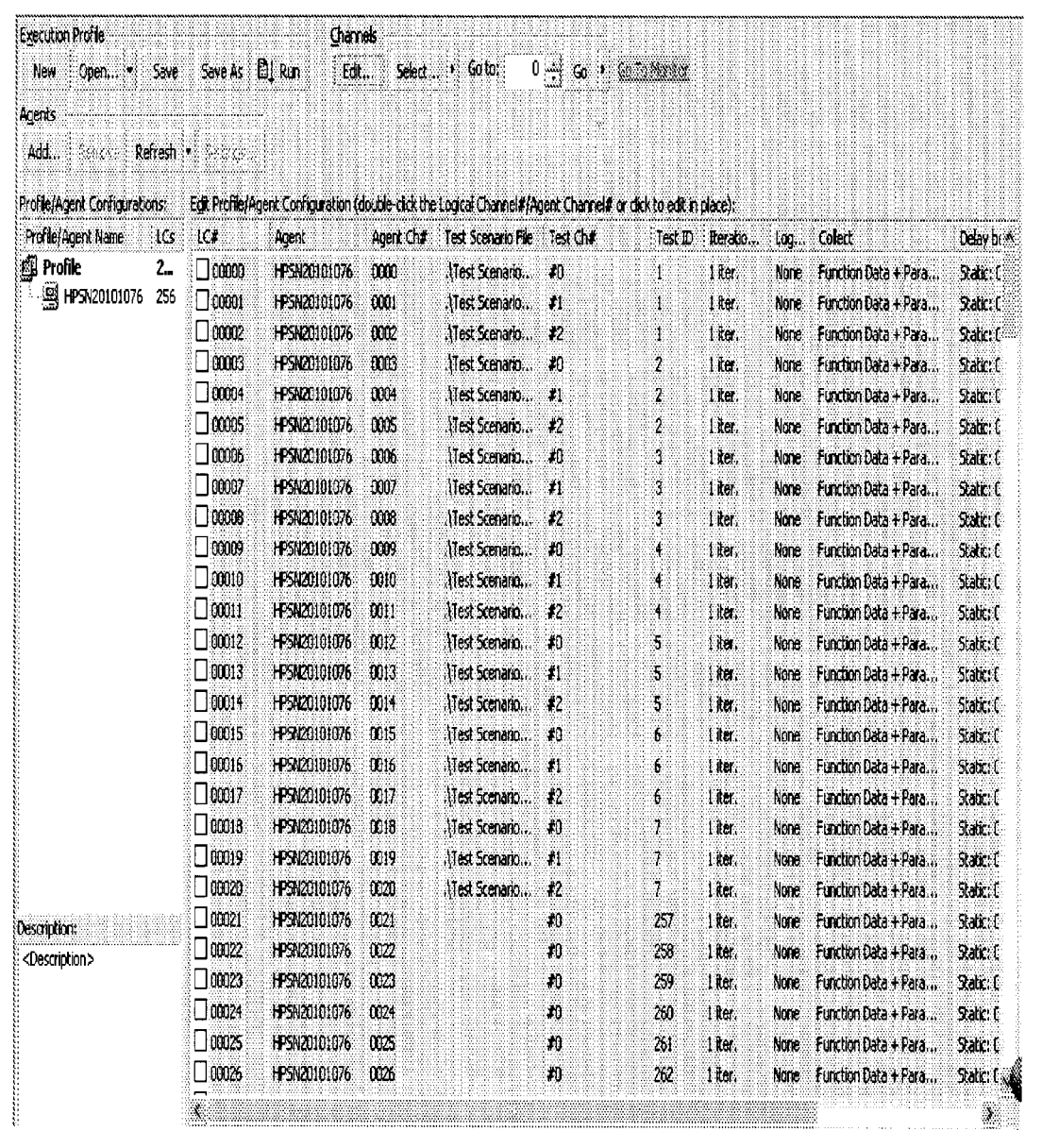

FIG. 28 shows an execution profile pane. As shown in the Profile/Agent Configuration pane, in this profile, there is only one computer, namely HP2010176, which controls 256. As an example, the Three channel conference call will be applied seven times to Logical Channels 0–20 in this profile. As shown in the Test Scenario File column, there is no Test Scenario file associated with any of the Logical Channels. In addition, the Test Ch. # column is blank. The first step in this process is to press the Edit button, which displays the data input dialogs shown in FIG. 29. From the screen, the information shown in FIG. 30 should be entered. Specifically, the Test Scenario file should be specified, (and the corresponding check box checked), the scenario channel dialog should be set to 0 to 2, step 1, and the automatically generate test IDs box should be checked. Finally, in the Step #2 section, the Range of Channels should be set for 0 to 20 step 1. By pressing the Apply button and pressing close, the updated execution profile shown in FIG. 31 is displayed. The Test Scenario file has now been specified for all of channels 0–20, and each of these Logical Channels has been associated with channel (0–2) of the Test Scenario file, as shown by the Test Ch. # column. In addition, each group of three channels has been assigned a test ID, as shown in the Test ID column.

While this example only applied Test Scenarios and their Relative Channels to 21 channels, the same technique could have been used to apply the Test Scenario to hundreds or thousands of channels. Most importantly, the associations can be made in a matter of seconds.

It should be repeated that although FIG. 31 displays Logical Channels, this is because the "Profile" line in Profile/Agent Configuration is highlighted. By highlighting the computer name (HP2010176) the Logical Channels shown for this computer are associated with the physical channels. (This is explained in more detail above in the discussion of FIGS. 3 and 4) Accordingly, the Relative Channels of the Test Scenario have been associated with physical channels. While in this example, the association is accomplished through the use of Logical Channels, many other techniques are well known defining correspondence between such physical and logical resources, and the present invention encompasses all such methodologies.

Execution Manager

The Execution Manager transmits the Test Scenario to each Agent in the Execution profile, and instructs the Agents to begin execution of the Test Scenario. In one embodiment, all communication between the Execution Manger and the Agents takes place via DCOM. Each Agent identifies and communicates with the other Agents if any synchronization has been specified between channels under the control of the other Agent. In one embodiment, the communication between Agents takes using TPC/IP on port 54321. Further information regarding the communications between the execution manager and Agents is included in the computer program listing referred to herein.

Synchronizing Test Scenarios Among Agents

In one embodiment, the Execution Manger sends the Test Scenario to each Agent. Because the Test Scenario includes an identification of each Agent and the Communications Channels associated with each Agent, the Agents are able to execute the Test Functions assigned to them, while simultaneously coordinating with other Agents to ensure synchronizations are properly coordinated. The synchronization mechanism works between two functions belonging to two different channels within the same Test Scenario. These channels may be executed on different computers. Every scenario function has a unique ID associated which is used and managed internally. Also, within every function, every output (e.g. OK, Timeout) has a name and a unique ID associated. The trigger relation is defined as followings:

```
typedef struct tag_TRIGGER {
    DWORD dwStructSize;      // the size of the structure
                             in bytes
    int iFromFunctionID;     // the triggering function ID
    int iToFunction ID;      // the triggered function ID
    int iFromOutputID;       // the triggering output ID
    TCHAR szFromOutputName [64]; // the triggering output name
}TRIGGER, *LPTRIGGER;
```

At runtime, the Execution Manager module will add to the above described structure the Agent computer IP address, where the triggered function will be executed. Just after a triggering function is executed, the corresponding trigger relation (between the triggering and the triggered function) becomes signaled (internal mechanism using TCP/IP communication between the computers where the triggering and triggered functions are executed). In case the triggering function exits on a different output than the one that belongs to the trigger relation (e.g. Let's suppose we have a MakeCall/PlayPrompt—ReceiveCall/RecordPrompt scenario on two channels and the MakeCall function, output "Connected", triggers the RecordPrompt function on the 2nd channel. Suppose that MakeCall fails and will exit on Timeout output for example), the trigger relation is invalidated and the execution on the triggered channel will be aborted.

In case a scenario function is triggered, the Execution Manager will wait for the corresponding trigger to become signaled (see above). By default the Execution Manager will wait 10 minutes for a trigger to be signaled or invalidated. The triggers are signaled/invalidated using a pure TCP/IP communication between the Agent computers.

Another application of an Agent is to emulate an IP gateway or device, either phone or fax. Specifically, an Agent may simulates the behavior of an IP gateway/device on the IP interface. This is used to test communication systems that have to interact with IP gateways in the real world. The use of an agent as a gateway/device simulator allows automated testing, and it can become unnecessary to actually purchase the emulated device to test whether a communications platform can properly interface with it. Either of two approaches may be used to create the Agent. In the first method, a profile for the gateway/device is created in accordance with the following steps.

First, the manufacturer's/device specification is analyzed to identify its supported features and protocols. Next, an Agent that simulates these features and protocols is written. Also, testing is performed on a real gateway/device to identify the specific behavior of the emulated gateway/device (anomalies, sequences of events that do not follow the standard, etc.) under various conditions. This involves generating traffic to the gateway/device and measuring the response, as well as monitoring real world traffic between the gateway/device and other devices. Those of skill in the art will appreciate that the types of devices measured dictate the use of one, the other or both ways. During analysis, each parameter or rule should be measured multiple times. An average value and standard deviation is calculated for all parameters. When simulating a gateway, this methodology our generates the following kinds of traffic:

Using the observed rules and random number generators for all data parameters having the same bell curve as the measured values Using the observed rules and a random selection of the measured parameter values Using the observed rules and the smallest vales measured for the data parameters Using the observed rules and the largest values measured for the data parameters.

When second methodology for creating the Agent is known as Record and Play. One plays or monitors a session with a real gateway/device and measures the parameter values used during that session and also record the event sequence. THi is then played back to the device under test using the measured parameter values and the same event sequence that was measured if possible. If the device under test is taking an unexpected route the Agent is written to respond according to the protocol/interface specification.

Using this methodology, it is possible to provide an extremely advantageous testing environment. For example, suppose a manufacturer has designed a new fax machine, and confirmed that it is compatible with the industry standard T.30 interface protocol for fax communication over analog phone lines. This will not be sufficient. The standard practice is for the manufacturer to purchase a fax machine from each manufacturer on the market, and to test its new fax machine with each of these. This is necessary because all actual implementations of protocols have anomalies and aspects in which they deviate from a published specification. Purchasing and testing with 200 or more fax machines can be very expensive and time consuming. Using the methodology described above, it is possible to for a single organization to purchase all 200 other fax machines, test them using the above methodology, and then write an Agent that simulates all of the machines. Then, using the communications testing system described herein, the manufacturer's new fax machined can be interfaced with the Agent the emulates the fax machines of multiple manufacturers. In one embodiment, when building a scenario, a T.30 Interface Protocol library will be provided. The user can select a MakeCall or SendFax Test Function for inclusion in a Test Scenario. As with many test functions, the icon representing this Test Function may be double clicked to display parameters. One of these parameters may be a drop-down list of makes and models of various fax machines that are emulated by the agent. In this manner, it is a relatively simple task to write a singe test scenario that would test the new fax machine with hundreds of (emulated) fax machines from different manufacturers. Once the first test sequence is created and saved as a Test Scenario file, the same file can be assigned to 199 additional logical channels. The phone number to dial can be the same for all of these channels. Next, the user would edit the SendFax function of each individual channel to specify a separate fax manufactuer/model for each each Logical Channel, so that all versions would be selected. Next, using the Time Profile methodology described above, delays may so that execution of each Test Sequence begins after a predetermined time period, set to a value to ensure that all prior test sequences will completed. Alternatively, the technique described above for synchronizing between channels may be used. Either of these approaches will ensure that all channels do not call the new fax machine under test simultaneously (otherwise, all but one of the calls would receive a busy signal).

The same general methodology described above can also be used to simulate other devices such as IP gateways.

The references listed below as well as all references cited in this specification are incorporated herein by reference to the extent that they supplement, explain, provide a background for or teach methodology or techniques employed herein: U.S. Pat. No. 6,058,181, U.S. Pat. No. 5,933,475, U.S. Pat. No. 5,761,272, U.S. Pat. No. 5,633,909, U.S. Pat. No. 5,546,453, U.S. Pat. No. 5,572,570, U.S. Pat. No. 6,201,853, U.S. Pat. No. 6,189,031, U.S. Pat. No. 6,148,277, U.S. Pat. No. 6,058,181, U.S. Pat. No. 5,987,633, U.S. Pat. No. 5,982,852, U.S. Pat. No. 5,978,940, U.S. Pat. No. 5,933,475, U.S. Pat. No. 5,854,889, U.S. Pat. No. 5,761,272, U.S. Pat. No. 5,633,909, U.S. Pat. No. 5,555,285, U.S. Pat. No. 5,546,453, CST Getting Started Guide, G3 Nova Technology, Inc. Westlake Village, Calif. 91362 (2002), CST Result Manager User's Guide, G3 Nova Technology, Inc. Westlake Village, Calif. 91362, (2002), CST Reference Manual, G3 Nova Technology, Inc. Westlake Village, Calif. 91362, (2002), CST Technical Information, G3 Nova Technology, Inc Westlake Village, Calif. 91362 (2002).

It will be understood that various details of the invention may be changed without departing from the scope of the invention. Furthermore, the foregoing description is for illustration only, and not for the purpose of limitation, the invention being defined by the claims.

We claim:

1. A communications platform testing system:
    wherein the communications platform comprises
        a plurality of Communications Channels through which telephony communications pass via at least two different Interface Protocols;
    the communications platform testing system comprising:
        a Test Scenario builder comprising
            means for defining a Test Function for controlling a first Communications Channel through which communications may pass using a first Interface Protocol;
            means for defining a Test Function for controlling a second Communications Channel through which communications may pass using a second Interface Protocol;
            means for graphically displaying icons representing Test Functions to be performed on the first and second Communications Channels, a first icon having an output area and a second icon having an input area;
            means for defining synchronicity between the Test Functions of different Communications Channels such that the execution of a Test Function of a second Communications Channel does not begin until completion of a Test Function on the first Communications Channel; wherein the means for defining synchronicity includes means for recognizing a cursor movement from the output area of the first icon to the input area of the second icon, such that a connection between the output area of the first icon and the input area of the second icon is graphically displayed
        an Execution Manager that:
            sends Communications Channel control commands to the communications platform in accordance with a Test Scenario,
            receives information regarding a status of the communications platform in response to sending the Communications Channel control commands to the communications platform; and
            is responsive to a defined synchronization between Test Functions in a Test Scenario for two different Communications Channels; and
        a Results Reporter operable to report the status of the plurality of Communications Channels during execution of a Test Scenario.

2. A method of building a Test Scenario to be executed on a communications test system, the method comprising the steps of:
    displaying a first Test Function icon having an output area;
    associating the first Test Function icon with a first Communications Channel of a communications platform to be tested, wherein in the first Communications Channel communicates via a first Interface Protocol and wherein telephony communications pass through the first Communications Channel;
    displaying a second Test Function icon having an input area;
    associating the second Test Function icon with a second Communications Channel of the communications platform to be tested, wherein in the second Communications Channel communicates via a second Interface Protocol and wherein the telephony communications pass through the second Communications Channel; and
    defining synchronicity between the first and second Test Function icons by recognizing a cursor movement from the output area of the first Test Function icon to the input area of the second Test Function icon.

3. The method of claim 2 further comprising the step of:
    graphically displaying a line representing the synchronicity, the line connecting the output area of the first Test Function icon to the input area of the second Test Function icon.

* * * * *